US008216069B2

(12) United States Patent
Ito

(10) Patent No.: US 8,216,069 B2
(45) Date of Patent: Jul. 10, 2012

(54) COMPUTER-READABLE STORAGE MEDIUM HAVING GAME PROGRAM STORED THEREIN, GAME SYSTEM, AND GAME DISPLAY METHOD

(75) Inventor: Jun Ito, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 328 days.

(21) Appl. No.: 12/721,710

(22) Filed: Mar. 11, 2010

(65) Prior Publication Data

US 2011/0136571 A1 Jun. 9, 2011

(30) Foreign Application Priority Data

Dec. 8, 2009 (JP) ................................ 2009-278794

(51) Int. Cl.
*A63F 9/24* (2006.01)
*A63F 13/00* (2006.01)
(52) U.S. Cl. ................... 463/33; 463/8; 463/31; 463/43
(58) Field of Classification Search ................ 463/8, 31, 463/33
See application file for complete search history.

(56) References Cited

U.S. PATENT DOCUMENTS

| 4,189,145 A * | 2/1980 | Stubben et al. ................. 463/33 |
| 5,577,961 A * | 11/1996 | Adamczyk et al. ............. 463/33 |
| 5,966,132 A * | 10/1999 | Kakizawa et al. ............. 345/419 |
| 6,139,434 A * | 10/2000 | Miyamoto et al. ............. 463/32 |
| 6,165,073 A * | 12/2000 | Miyamoto et al. ............. 463/32 |
| 6,261,179 B1 * | 7/2001 | Miyamoto et al. ............. 463/23 |
| 6,296,570 B1 * | 10/2001 | Miyamoto et al. ............. 463/30 |
| 6,409,596 B1 * | 6/2002 | Hayashida et al. ............. 463/31 |
| 6,522,312 B2 * | 2/2003 | Ohshima et al. ................. 345/8 |
| 6,835,136 B2 * | 12/2004 | Kitao ............................... 463/33 |
| 6,932,705 B2 * | 8/2005 | Nakazato ........................ 463/31 |
| 6,951,515 B2 * | 10/2005 | Ohshima et al. ................ 463/31 |
| 7,004,838 B2 * | 2/2006 | Hayashida et al. ............. 463/31 |
| 7,513,829 B2 * | 4/2009 | Hayashida et al. ............. 463/30 |
| 7,588,497 B2 * | 9/2009 | Yasui et al. ..................... 463/33 |
| 7,806,767 B2 * | 10/2010 | Kitao ............................... 463/31 |
| 7,963,833 B2 * | 6/2011 | Novak et al. ...................... 463/2 |
| 2003/0032484 A1 * | 2/2003 | Ohshima et al. ................ 463/43 |
| 2003/0166413 A1 * | 9/2003 | Hayashida et al. ............. 463/30 |
| 2003/0186741 A1 * | 10/2003 | Hayashida et al. ............. 463/31 |
| 2004/0219980 A1 * | 11/2004 | Bassett et al. ................... 463/33 |
| 2006/0084509 A1 * | 4/2006 | Novak et al. .................... 463/49 |
| 2006/0258449 A1 * | 11/2006 | Yasui et al. ..................... 463/31 |
| 2007/0032297 A1 * | 2/2007 | Hara ............................... 463/32 |
| 2010/0085355 A1 * | 4/2010 | Nomura ........................ 345/419 |
| 2010/0248804 A1 * | 9/2010 | Matsumaru ....................... 463/4 |

FOREIGN PATENT DOCUMENTS

JP 2000-107465 4/2000

* cited by examiner

*Primary Examiner* — Steven J Hylinski

(74) *Attorney, Agent, or Firm* — Nixon & Vanderhye P.C.

(57) ABSTRACT

In a game system, a position coordinate calculation section calculates a position coordinate of each object. Then, a coordinate determination section determines whether or not the position coordinate of a missile is located on a side of the virtual camera relative to a player object. For the missile determined to be located on the side of the virtual camera, a correction coordinate calculation section calculates a correction coordinate which is obtained by shifting the position coordinate of the missile to a side of the player object relative to the position coordinate of the missile. In this case, an image of the virtual game space, in which the player object is located at the position coordinate thereof and the missile is located at the correction coordinate thereof, is displayed on a liquid crystal television.

22 Claims, 17 Drawing Sheets

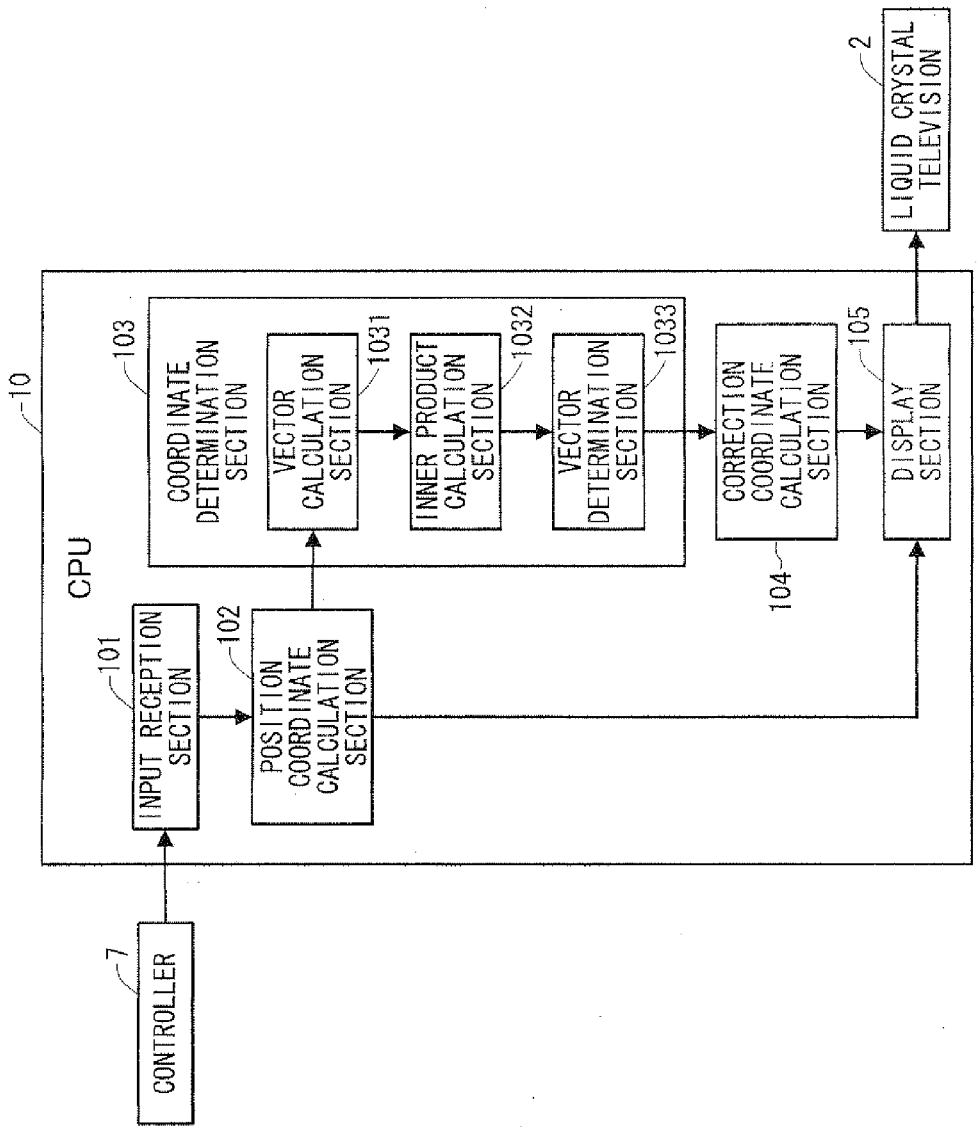

COMPUTER-READABLE STORAGE MEDIUM HAVING GAME PROGRAM STORED THEREIN, GAME SYSTEM, AND GAME DISPLAY METHOD

CROSS REFERENCE TO RELATED APPLICATION

The disclosure of Japanese Patent Application No. 2009-278794, filed on Dec. 8, 2009, is incorporated herein by reference.

BACKGROUND OF THE INVENTION

1. Field of the Invention

The present invention relates to a computer-readable storage medium having stored therein a game program to be executed by a computer of a game apparatus, a game system, and a game display method. More particularly, the present invention relates to a computer-readable storage medium having stored therein a game program to be executed by a computer of a game apparatus which displays, on a display device, an image of an object within a virtual game space being seen from a viewpoint of a virtual camera, a game system, and a game display method.

2. Description of the Background Art

In a so-called shooting game or action game, a game apparatus performs a process of drawing an image of an object existing within a virtual game space being seen from a virtual camera also existing within the virtual game space (for example, see Japanese Laid-Open Patent Publication No. 2000-107465). Japanese Laid-Open Patent Publication No. 2000-107465 discloses a technique concerning a control of a viewpoint of a virtual camera, by which, when a game player operates a viewpoint change switch, an image showing that an aircraft operated by the player is flying, which is seen from a viewpoint (first-person viewpoint) of a cockpit of the aircraft, and an image showing that the aircraft is flying, which is seen from a behind viewpoint (third-person viewpoint) located behind the aircraft, are changed over from one to the other and displayed on a screen.

Here, in the conventional game disclosed in Japanese Laid-Open Patent Publication No. 2000-107465, when the virtual camera is controlled such that an object (the aircraft in Japanese Laid-Open Patent Publication No. 2000-107465) which is an observation target is constantly displayed at or near the center of the screen, another object located outside a field of view of the virtual camera, such as an object located behind the virtual camera, cannot be displayed even if the object is located near the observation target. This may cause a disadvantage for the player, in that, for example, a missile located near the aircraft is not displayed on the screen because the missile is outside the field of view of the virtual camera. To solve the problem, it is conceivable to make the viewpoint of the virtual camera further away from the observation target such that another object can be included in the field of view of the virtual camera. In this case, however, another problem arises that the observation target is displayed in a small size because the viewpoint of the virtual camera is made further away from the observation target.

SUMMARY OF THE INVENTION

Therefore, an objective of the present invention is to provide: a computer-readable storage medium having stored therein a game program which enables an object not included in a field of view of a virtual camera to be displayed without making a viewpoint of the virtual camera further away from an observation target; a game system which enables an object not included in a field of view of a virtual camera to be displayed without making a viewpoint of the virtual camera further away from an observation target; and a game display method which enables an object not included in a field of view of a virtual camera to be displayed without making a viewpoint of the virtual camera further away from an observation target.

A computer-readable storage medium having a game program stored therein according to the present invention is a computer-readable storage medium having stored therein a game program to be executed by a computer of a game apparatus which displays, on a display device, an image, captured by a virtual camera, of an object included in a virtual game space. The game program causes the computer to function as position coordinate calculation means, coordinate determination means, correction coordinate calculation means, and display means. The position coordinate calculation means calculates a position coordinate of a first object which is an object observed by the virtual camera and a position coordinate of a second object which is at least one object different from the first object. The coordinate determination means determines, based on the position coordinate of the second object, whether or not the second object is located on a side of the virtual camera relative to a predetermined point which is located ahead of the virtual camera. The correction coordinate calculation means calculates, for the second object determined by the coordinate determination means to be located on the side of the virtual camera, a correction coordinate which is a coordinate obtained by shifting the position coordinate of the second object to a side of the predetermined point relative to the position coordinate of the second object. The display means displays, on the display device, an image of the virtual game space in which the first object is located at the position coordinate thereof, and the second object, which has been determined by the coordinate determination means to be located on the side of the virtual camera, is located at the correction coordinate thereof.

By the game apparatus executing a game process based on the game program, parameters concerning the virtual camera, such as a viewpoint position, a viewing angle, and the like, of the virtual camera, are controlled such that the virtual camera observes the first object. As a result, the first object is displayed at or near the center of a screen of the display device. In addition to the first object which is observed by the virtual camera in this manner, the second object also exists in the virtual game space. The second object is an object which is not observed by the virtual camera. For example, the first object is a player object operated by a player, and the second object is a non-player object different from the player object. Here, for example, the first object may be a predetermined non-player object, and the second objects may be the player object and other non-player objects. In the game apparatus, the position coordinate calculation means calculates position coordinates of the first object and the second object in the virtual game space. In response thereto, the coordinate determination means determines whether or not the second object is located on the side of the virtual camera relative to the predetermined point which is located ahead of the virtual camera. As an example of the predetermined point, the position coordinate of the first object can be mentioned, but the predetermined point is not limited thereto. The predetermined point may be, for example, set between the virtual camera and the first object, or alternatively set ahead of the first object when seen from the virtual camera.

When a determination process is performed by the coordinate determination means, as a correction coordinate of the second object which has been determined to be located on the side of the virtual camera relative to the predetermined point, a coordinate obtained by shifting the position coordinate of the second object to the side of the predetermined point relative to the position coordinate of the second object is calculated. Then, the display means displays, on the display device, an image of the virtual game space captured by the virtual camera, in which the first object and the second object which is not located on the side of the virtual camera relative to the predetermined point are located at their respective position coordinates, and the second object which is located on the side of the virtual camera relative to the predetermined point is located at the correction coordinate thereof. The image of the virtual game space is an image captured by the virtual camera under a state where the second object which is located on the side of the virtual camera relative to the predetermined point is shifted to the side of the predetermined point relative to the position coordinate of the second object. Therefore, an image of the virtual game space in a state where the second object located outside the field of view of the virtual camera such as the second object located behind the virtual camera, is included in the field of view, can be displayed without changing a distance from the first object to the viewpoint of the virtual camera.

The correction coordinate calculation means may calculate, as the correction coordinate of the second object which has been determined by the coordinate determination means to be located on the side of the virtual camera, a coordinate obtained by shifting the position coordinate of the second object in an image capturing direction of the virtual camera.

In this configuration, the correction coordinate which is a coordinate obtained by shifting the position coordinate of the second object in the image capturing direction of the virtual camera (a direction oriented from the viewpoint of the virtual camera to the predetermined point) is calculated. Therefore, an unnatural display such as a display in which the position of the second object on the screen is changed, can be prevented.

The correction coordinate calculation means may calculate, as the correction coordinate of the second object which has been determined by the coordinate determination means to be located on the side of the virtual camera, a coordinate obtained by shifting the position coordinate of the second object toward the predetermined point.

Depending on the position coordinate of the second object or a distance of shift from the position coordinate to the correction coordinate, the correction coordinate obtained by shifting the position coordinate in the image capturing direction of the virtual camera may be located outside the field of view of the virtual camera. As a result, an image of the second object may not be captured by the virtual camera. In the above-described configuration, the correction coordinate of the second object is calculated so as to make the correction coordinate linearly closer to the predetermined point which is located ahead of the virtual camera. Therefore, a second object, which is located outside the field of view of the virtual camera even though a correction coordinate obtained by shifting the position coordinate in the image capturing direction of the virtual camera is calculated, can be displayed on the screen so as to be included in the field of view of the virtual camera.

The correction coordinate calculation means may calculate, as the correction coordinate of the second object which has been determined by the coordinate determination means to be located on the side of the virtual camera, a coordinate obtained by shifting the position coordinate of the second object to a position on the side of the virtual camera relative to the predetermined point.

When a coordinate which is located further ahead of the predetermined point located ahead of the virtual camera is calculated as the correction coordinate of the second object, for example, there is the possibility that the second object, which should originally be located behind the first object, is located ahead of the first object and displayed in this state. In the above-described configuration, occurrence of the aforementioned problem can be prevented, because the correction coordinate calculated by the correction coordinate calculation means is a coordinate on the side of the virtual camera relative to the predetermined point.

The correction coordinate calculation means may calculate the correction coordinate of the second object which has been determined by the coordinate determination means to be located on the side of the virtual camera, based on a first distance from the predetermined point to the position coordinate of the second object in the image capturing direction of the virtual camera.

When the correction coordinate is calculated such that a distance from the predetermined point to the correction coordinate of the second object in the image capturing direction of the virtual camera is shorter than the first distance, a correction coordinate obtained by shifting the second object to the side of the predetermined point relative to the position coordinate of the second object is calculated. Therefore, in the above-described configuration, the correction coordinate of the second object can easily be calculated.

The correction coordinate calculation means may calculate the correction coordinate of the second object which has been determined by the coordinate determination means to be located on the side of the virtual camera, such that a distance from the predetermined point to the correction coordinate of the second object in the image capturing direction of the virtual camera is a predetermined ratio of the first distance.

In this configuration, when, for example, a plurality of second objects exist within the virtual game space, the position coordinates of the respective second objects are corrected so as to be shifted at the same ratio. As a result of the second objects being placed at their respective correction coordinates, an unnatural display can be effectively prevented, such as a display in which the second object of which a distance from the predetermined point in the image capturing direction of the virtual camera is relatively large is displayed nearer to the predetermined point than the second object of which a distance from the predetermined point is relatively small is.

The coordinate determination means may determine whether or not the second object is located on the side of the virtual camera relative to the predetermined point with respect to an image capturing direction of the virtual camera.

In this configuration, in order to determine whether or not the position coordinate of the second object is located on the side of the virtual camera relative to the predetermined point, only an image capturing direction component of the position coordinate may be used. Therefore, the determination can easily be performed by the coordinate determination means.

The coordinate determination means may determine whether or not the second object is located on the side of the virtual camera relative to the predetermined point, based on an orientation of a line segment of which edge points are the position coordinate of the virtual camera and the predetermined point, and an orientation of a line segment of which edge points are the predetermined point and the position coordinate of the second object.

In this configuration, the determination can easily be performed by the coordinate determination means.

The coordinate determination means may include vector calculation means and vector determination means. The vector calculation means calculates a camera orientation vector of which an initial point is a position of the virtual camera and an end point is the predetermined point, and an object orientation vector of which an initial point is the predetermined point and an end point is the position coordinate of the second object. The vector determination means determines whether or not the second object is located on the side of the virtual camera relative to the predetermined point, based on the camera orientation vector and the object orientation vector calculated by the vector calculation means.

In this configuration, the determination can further easily be performed by the coordinate determination means.

The coordinate determination means may further include inner product calculation means for calculating an inner product of the camera orientation vector and the object orientation vector. In this case, the vector determination means determines whether or not the second object is located on the side of the virtual camera relative to the predetermined point, based on the inner product calculated by the inner product calculation means.

In this configuration, the determination can further easily be performed by the coordinate determination means.

The vector determination means may determine whether or not the second object is located on the side of the virtual camera relative to the predetermined point, based on a magnitude relation between the inner product calculated by the inner product calculation means and a predetermined threshold value.

In this configuration, whether or not the second object is located on the side of the virtual camera relative to the predetermined point is determined based on the magnitude relation between the inner product calculated by the inner product calculation means and the predetermined threshold value. Therefore, when, for example, the determination is performed for a plurality of second objects, an accurate determination can be performed.

The position coordinate calculation means may calculate position coordinates of the two or more second objects. The coordinate determination means may determine whether or not each of the second objects, of which the position coordinates are calculated by the position coordinate calculation means, is located on the side of the virtual camera relative to the predetermined point.

In this configuration, an image of the virtual game space, in which a plurality of second objects located outside the field of view of the virtual camera is included in the field of view, is displayed. This can prevent an unnatural display such as a display in which, while one second object located outside the field of view of the virtual camera is displayed on the screen, another second object similarly located outside the field of view is not displayed on the screen.

It is preferred that the predetermined point is set between a position of the virtual camera and the first object with respect to the image capturing direction of the virtual camera or between the position of the virtual camera and an observed point observed by the virtual camera with respect to the image capturing direction of the virtual camera.

When the predetermined point is set at a position ahead of the first object with respect to the image capturing direction of the virtual camera, the process of calculating a correction coordinate is performed for a second object which is located ahead of the first object. As a result, an image in which the second object is located farther from the first object may be displayed. The same applies to a case where the predetermined point is set at a position ahead of an observed point with respect to the image capturing direction of the virtual camera. In the above-described configuration, an unnatural display can be prevented such as a display in which the second object located behind the first object is located ahead of the first object with respect to the image capturing direction of the virtual camera, or in which the second object located behind the predetermined point is located ahead of the predetermined point with respect to the image capturing direction of the virtual camera.

The predetermined point may be the position coordinate of the first object, or may be the observed point.

In this configuration, a natural image can be displayed in which the second object is made closer to the first object or the observed point in the image capturing direction of the virtual camera.

The display means may display, as an image captured by the virtual camera, an image of a drawing space different from a space in which the first object and the second object are located at their respective position coordinates, on the display device.

In the game apparatus, a general game process, such as a control of movements of objects and a determination of contact between objects, is performed based on the space in which the first object and the second object are located at their respective position coordinates. In the above-described configuration, the image of the drawing space different from the aforesaid space is displayed on the display device. In this manner, the position coordinates of the objects within the game space are not changed by the process of the present invention. Therefore, the image of the virtual game space showing a state where the second object located outside the field of view of the virtual camera is included in the field of view, can be displayed without disturbing the game process which is generally performed in various games.

It is preferred that the display means displays, on the display device, an image captured by the virtual camera, in which the position coordinate of the first object, the position coordinate of the second object which has been determined by the coordinate determination means to be not located on the side of the virtual camera, and the correction coordinate of the second object which has been determined by the coordinate determination means to be located on the side of the virtual camera, are center-of-gravity coordinates of the respective objects.

In this configuration, an image of the virtual game space in which the second object located outside the field of view of the virtual camera is included in the field of view, can be displayed in a more natural manner.

The program may cause the computer to function further as input reception means for receiving an input of operation information from input means which is operated by a player. In this case, the position coordinate calculation means calculates the position coordinate of the first object, based on the operation information received by the input reception means.

The first object is a player object operated by a player. On the screen of the display device, an image of the virtual game space showing the player object being observed is displayed. In the image, for example, an enemy object, a missile launched from the enemy object, or the like, which tries to attack the player object, is displayed as the second object which is located outside the field of view of the virtual camera. This can effectively prevent the player from being disadvantaged by a state where the enemy object is located outside the field of view of the virtual camera and therefore not displayed even though the enemy object is located near the player object.

The present invention is also directed to a game system which displays on a display device an image, captured by a virtual camera, of an object included in a virtual game space. The game system includes position coordinate calculation means, coordinate determination means, correction coordinate calculation means, and display means. The position coordinate calculation means calculates a position coordinate of a first object which is an object observed by the virtual camera and a position coordinate of a second object which is at least one object different from the first object. The coordinate determination means determines, based on the position coordinate of the second object, whether or not the second object is located on a side of the virtual camera relative to a predetermined point which is located ahead of the virtual camera. The correction coordinate calculation means calculates, for the second object determined by the coordinate determination means to be located on the side of the virtual camera, a correction coordinate which is a coordinate obtained by shifting the position coordinate of the second object to a side of the predetermined point relative to the position coordinate of the second object. The display means displays, on the display device, an image of the virtual game space in which the first object is located at the position coordinate thereof, and the second object, which has been determined by the coordinate determination means to be located on the side of the virtual camera, is located at the correction coordinate thereof.

The present invention is also directed to a game display method for displaying on a display device an image, captured by a virtual camera, of an object included in a virtual game space. In the game display method, firstly, a step of calculating a position coordinate of a first object which is an object observed by the virtual camera and a position coordinate of a second object which is at least one object different from the first object, is performed. Next, a step of determining, based on the position coordinate of the second object, whether or not the second object is located on a side of the virtual camera relative to a predetermined point which is located ahead of the virtual camera, is performed. Subsequently, a step of calculating, for the second object determined to be located on the side of the virtual camera, a correction coordinate which is a coordinate obtained by shifting the position coordinate of the second object to a side of the predetermined point relative to the position coordinate of the second object, is performed. Then, a step of displaying, on the display device, an image of the virtual game space in which the first object is located at the position coordinate thereof, and the second object, which has been determined to be located on the side of the virtual camera, is located at the correction coordinate thereof, is performed.

According to the present invention, an image of the virtual game space, in which an object located outside the field of view of the virtual camera, such as an object located behind the virtual camera, is included in the field of view, can be displayed. Therefore, an object which could not appear on the screen by the conventional drawing method can be displayed without making the viewpoint of the virtual camera further away from an observation target.

These and other objects, features, aspects and advantages of the present invention will become more apparent from the following detailed description of the present invention when taken in conjunction with the accompanying drawings.

BRIEF DESCRIPTION OF THE DRAWINGS

FIG. 8 is a function block diagram showing an exemplary functional configuration of the game apparatus 3 which executes a game program according to an embodiment of the present invention;

DESCRIPTION OF THE PREFERRED EMBODIMENTS

Figure 1:
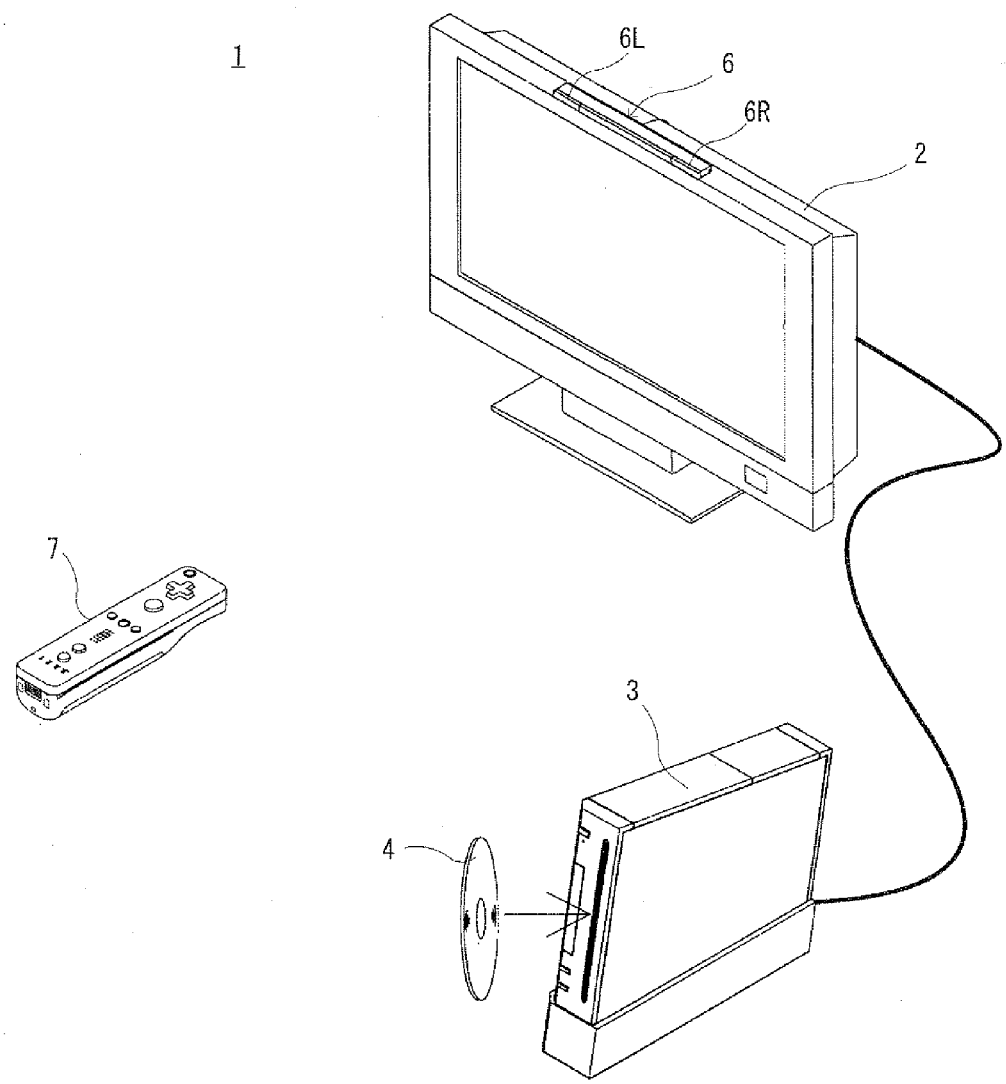
FIG. 1 is an external perspective view of a game system 1.

In the following, an embodiment of the present invention will be described with reference to the drawings as appropriate. FIG. 1 is an external perspective view of a game system 1 which includes a game apparatus 3 according to an embodiment of the present invention. In the present embodiment, a game system and a computer-readable storage medium having a game program stored therein, according to the present invention, will be described taking as an example a case where a game apparatus is the game apparatus 3 of stationary type. However, the game apparatus may be, for example, a portable type game apparatus in which a game apparatus and a display device are integrally formed.

[Whole Configuration of Game System 1]

Firstly, an overview of components of the game system 1 will be described. In FIG. 1, the game system 1 includes a liquid crystal television 2, the game apparatus 3, an optical disc 4, a marker unit 6, and a controller 7. In the game system 1, the game apparatus 3 executes a game process based on a game operation performed by a player using the controller 7.

The optical disc 4, which is an exemplary information storage medium changeable with respect to the game apparatus 3, is detachably loaded into the game apparatus 3. A game program that is executed in the game apparatus 3 is stored on the optical disc 4. On a front surface of the game apparatus 3, a slot through which the optical disc 4 is inserted is provided. The game apparatus 3 executes a game process by reading and executing the game program stored on the optical disc 4 which has been inserted through the slot.

The liquid crystal television 2 (an example of the display device) is connected via a connection cord to the game apparatus 3. As will be described later, the game apparatus 3 generates an image (game image) of a virtual game space including an object seen from a viewpoint of a virtual camera 30 (see FIG. 6), and outputs the image to the liquid crystal television 2. This series of processes are performed in units of a frame (e.g., at intervals of 1/60 sec) in this embodiment. The liquid crystal television 2 receives a game image outputted from the game apparatus 3 in this manner, and displays the game image on a display screen.

The marker unit 6 is provided in the vicinity of the screen of the liquid crystal television 2 (on an upper side of the screen in FIG. 1). The marker unit 6 comprises two markers 6R and 6L at both ends thereof. Specifically, the marker 6R includes one or more infrared LEDs that output infrared light toward the front of the liquid crystal television 2 (the same is true of the marker 6L). The marker unit 6 is connected to the game apparatus 3, so that the game apparatus 3 can control ON/OFF of each infrared LED included in the marker unit 6. The marker unit 6 is also provided with a microphone (not shown). Audio information inputted through the microphone is inputted to the game apparatus 3.

The controller 7 is input means which is operated by a player, and is an input device which outputs to the game apparatus 3 operation data indicating an operation performed with respect to itself. The controller 7 and the game apparatus 3 are connected via wireless communication. In this embodiment, for example, the Bluetooth (registered trademark) technology is used for wireless communication between the controller 7 and the game apparatus 3. Note that, in another embodiment, the controller 7 and the game apparatus 3 may be connected via wired communication.

[Internal Configuration of Game Apparatus 3]

Figure 2:
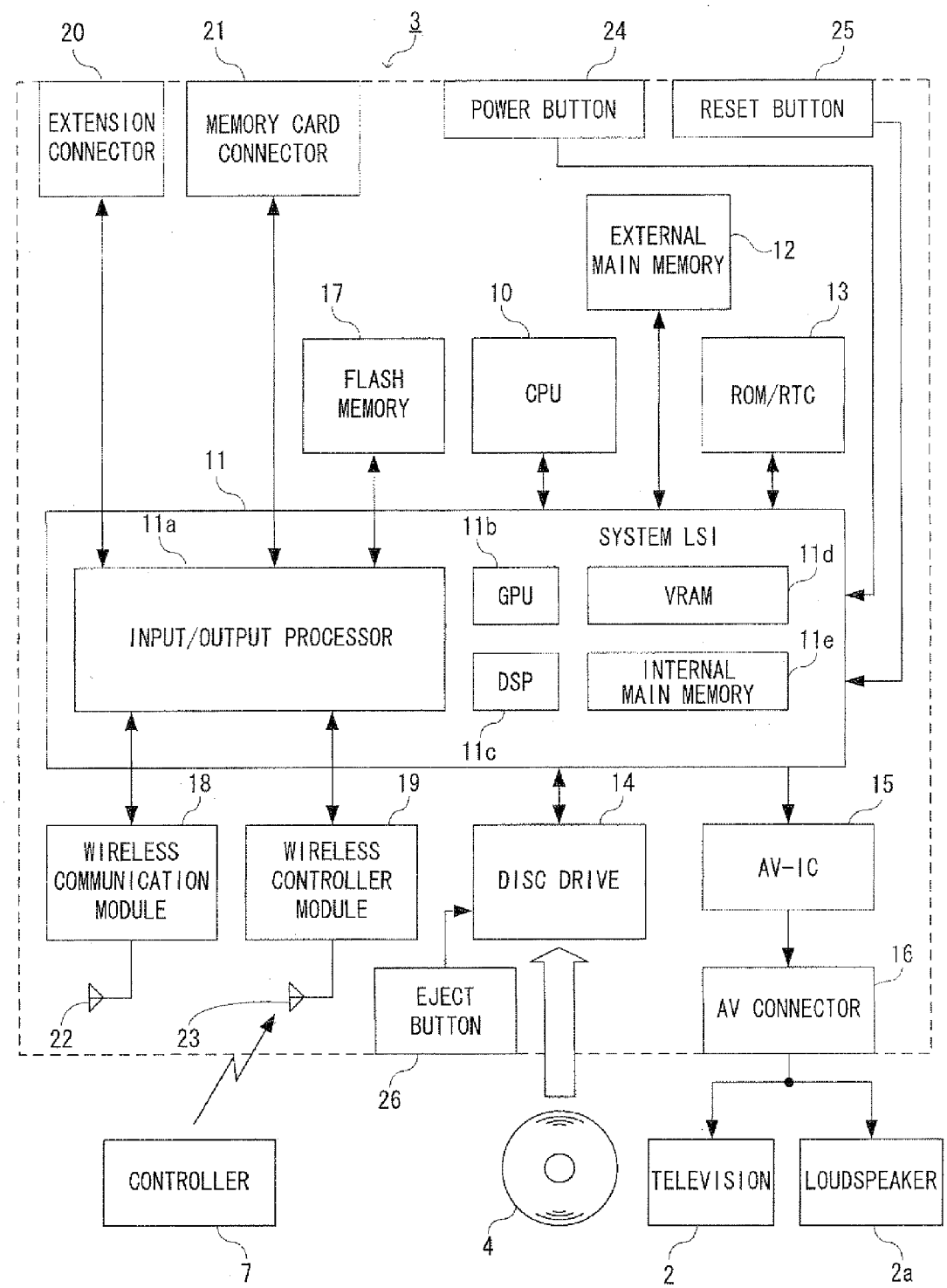
FIG. 2 is a block diagram of a game apparatus 3 according to an embodiment of the present invention.

Next, an internal configuration of the game apparatus 3 will be described with reference to FIG. 2. FIG. 2 is a block diagram showing the configuration of the game apparatus 3. The game apparatus 3 has a CPU 10, a system LSI 11, an external main memory 12, a ROM/RTC 13, a disc drive 14, an AV-IC 15, and the like.

The CPU 10 executes a game program stored on the optical disc 4 to perform the game process, i.e., functions as a game processor. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes, such as controlling data transfer between each component connected thereto, generating an image to be displayed, obtaining data from an external apparatus, and the like. An internal configuration of the system LSI 11 will be described below.

The external main memory 12 is a volatile memory. The external main memory 12 stores a program, such as a game program read out from the optical disc 4, a game program read out from a flash memory 17, or the like, or various kinds of data, and is used as a work area, a buffer area or the like for the CPU 10.

The ROM/RTC 13 has a ROM (so-called boot ROM) which stores a program for booting the game apparatus 3, and a clock circuit (RTC: Real Time Clock) which counts time.

The disc drive 14 reads out program data, texture data or the like from the optical disc 4, and writes the read data into an internal main memory 11e (described below) or the external main memory 12.

The system LSI 11 also includes an input/output processor (I/O processor) 11a, a GPU (Graphics Processor Unit) 11b, a DSP (Digital Signal Processor) 11c, a VRAM 11d, and the internal main memory 11e. The components 11a to 11e are connected to each other via an internal bus (not shown).

The GPU 11b, which is a part of a drawing means, generates an image in accordance with a graphics command (image drawing command) from the CPU 10. The VRAM 11d stores data (e.g., polygon data, texture data, etc.) which is required by the GPU 11b to execute the graphics command. When an image is generated, the GPU 11b generates image data using data stored in the VRAM 11d.

The DSP 11c, which functions as an audio processor, generates audio data using sound data, sound waveform (tone color) data or the like stored in the internal main memory 11e, the external main memory 12 or the like.

The image data and audio data thus generated are read out by the AV-IC 15. The AV-IC 15 outputs the read image data via an AV connector 16 to the liquid crystal television 2, and the read audio data to a loudspeaker 2a built in the liquid crystal television 2. Thereby, an image is displayed on the liquid crystal television 2 while a sound is outputted from the loudspeaker 2a.

The input/output processor 11a executes data transmission and reception between components connected thereto, or downloads data from an external apparatus. The input/output processor 11a is connected to the flash memory 17, a wireless communication module 18, a wireless controller module 19, an extension connector 20, and a memory card connector 21. An antenna 22 is connected to the wireless communication module 18, and an antenna 23 is connected to the wireless controller module 19.

The input/output processor 11a is connected via the wireless communication module 18 and the antenna 22 to a network, and can communicate with other game apparatuses or various servers connected to the network. The input/output processor 11a regularly accesses the flash memory 17 to detect the presence or absence of data that needs to be transmitted to the network. In the case of the presence of the data, the input/output processor 11a transmits the data via the wireless communication module 18 and the antenna 22 to the network. The input/output processor 11a also receives data transmitted from another game apparatus or data downloaded from a download server via the network, the antenna 22, and the wireless communication module 18, and stores the received data into the flash memory 17. The CPU 10 executes a game program to read out the data stored in the flash memory 17 and utilizes the data in the game program. In addition to data communicated between the game apparatus 3 and other game apparatuses or various servers, save data (result data or intermediate data of a game) of a game played using the game apparatus 3 may be stored into the flash memory 17.

The input/output processor 11a also receives operation data transmitted from the controller 7 via the antenna 23 and the wireless controller module 19, and stores (temporarily stores) the operation data into a buffer area of the internal main memory 11e or the external main memory 12.

Also, the extension connector 20 and the memory card connector 21 are connected to the input/output processor 11a.

The extension connector 20 is a connector for interface, such as USB or SCSI. When a medium (e.g., an external storage medium, etc.), a peripheral device (e.g., another controller, etc.), or a wired communication connector is connected to the extension connector 20, communication with a network can be performed without using the wireless communication module 18. The memory card connector 21 is a connector for connecting an external storage medium, such as a memory card or the like. For example, the input/output processor 11a can access an external storage medium via the extension connector 20 or the memory card connector 21 to save data or read out data.

The game apparatus 3 is provided with a power button 24, a reset button 25, and an eject button 26. The power button 24 and the reset button 25 are connected to the system LSI 11. When the power button 24 is pressed down, power is supplied via an AC adaptor (not shown) to each component of the game apparatus 3. When the reset button 25 is pressed down, the system LSI 11 reboots the boot program of the game apparatus 3. The eject button 26 is connected to the disc drive 14. When the eject button 26 is pressed down, the optical disc 4 is ejected from the disc drive 14.

[Configuration of Controller 7]

Figure 3:
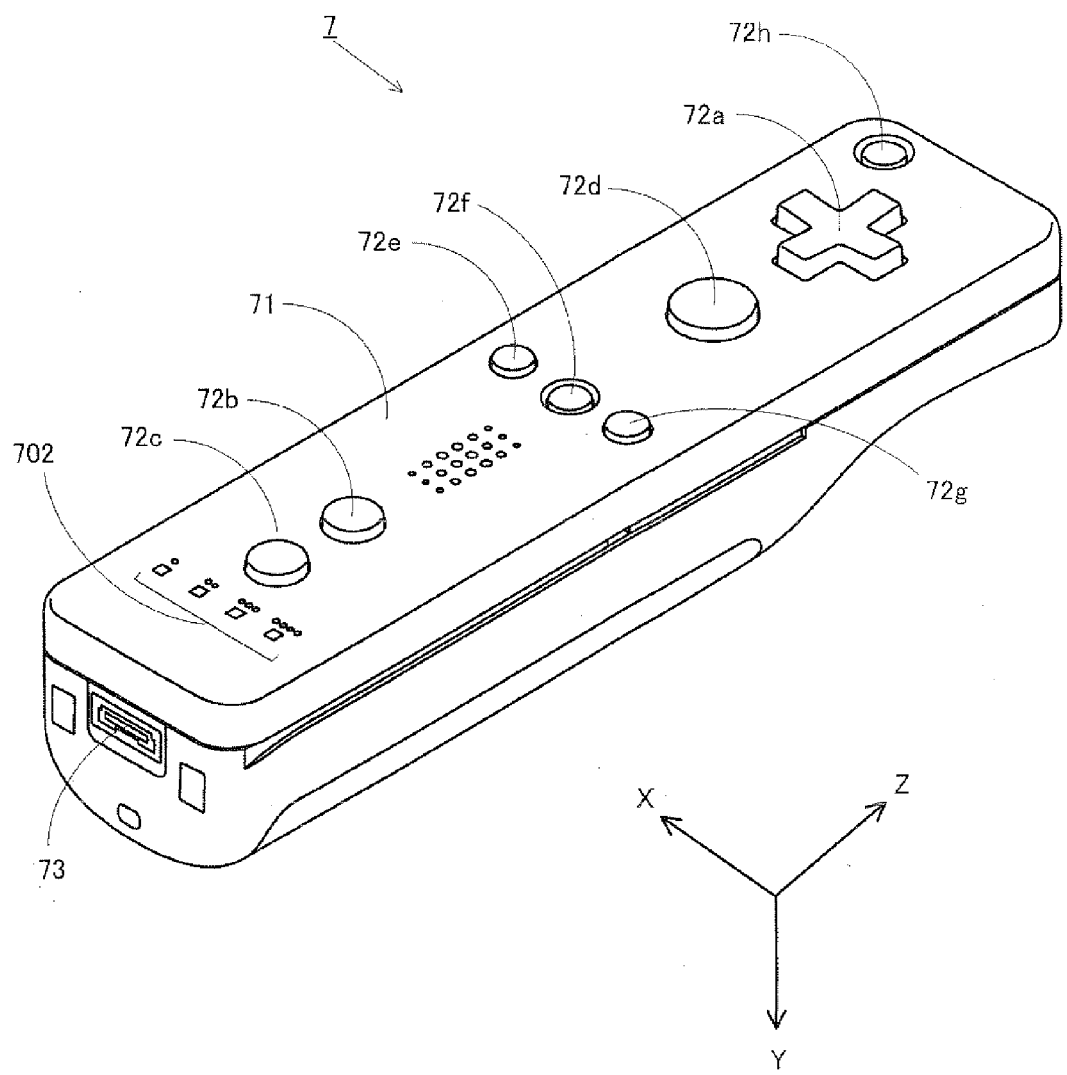
FIG. 3 is a perspective view showing a controller 7 as viewed from the top and the rear.
Figure 4:
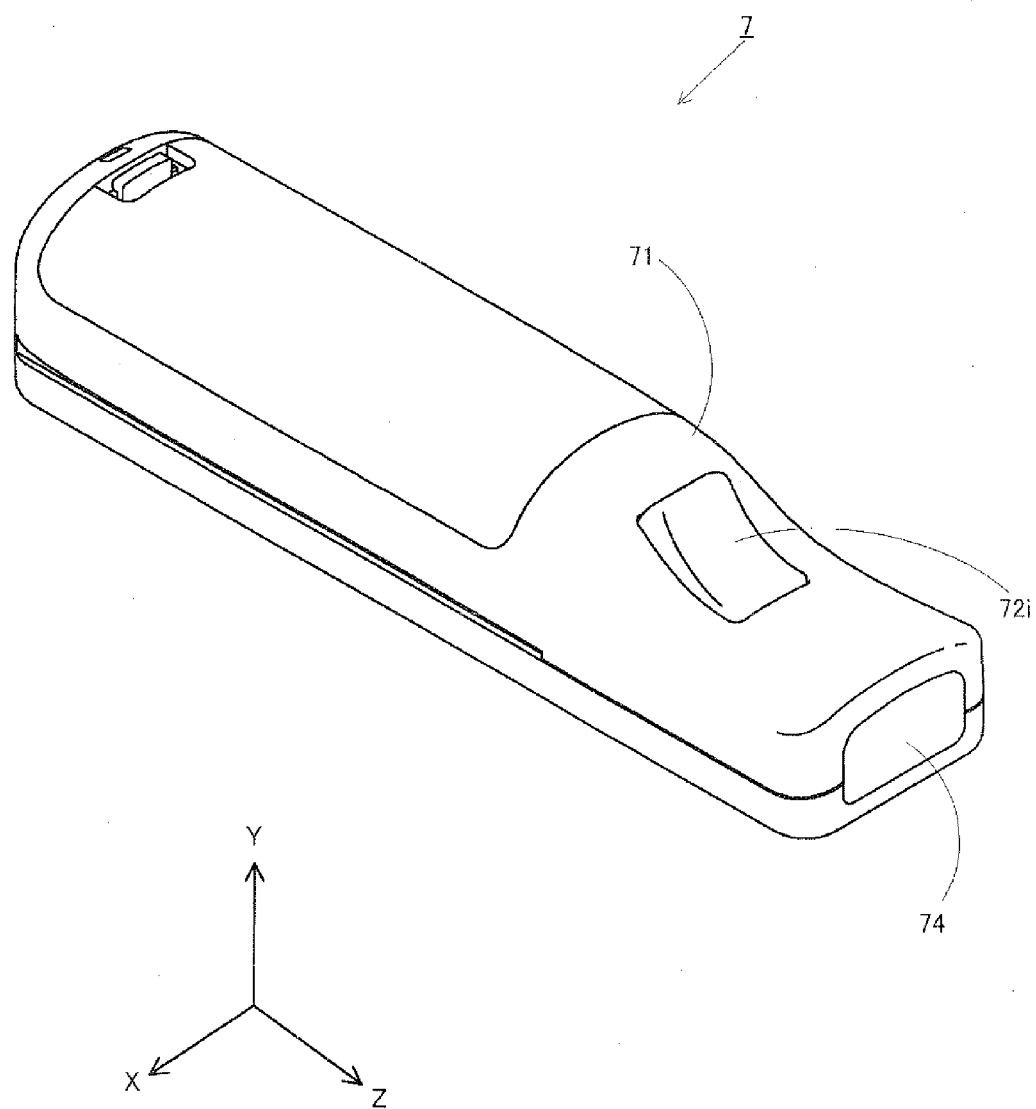
FIG. 4 is a perspective view showing the controller 7 as viewed from the bottom and the front.

An external configuration of the controller 7 will be described with reference to FIGS. 3 and 4. FIG. 3 is a perspective view of the controller 7 as viewed from the top and the rear. FIG. 4 is a perspective view of the controller 7 as viewed from the bottom and the front.

As shown in FIGS. 3 and 4, the controller 7 has a housing 71 formed by, for example, plastic molding. The housing 71 is in the shape of substantially a rectangular parallelepiped where a front-to-rear direction thereof is a longitudinal direction thereof. The whole housing 71 has a size which allows an adult and a child to hold the controller 7 with one hand. The housing 71 has an operation portion 72.

The operation portion 72 provided on an upper surface of the housing 71 includes a cross key 72a, an operation buttons 72b to 72g, and an operation button 72h.

The cross key 72a is a four-direction push switch in the shape of a cross, and has operation portions corresponding to the respective four directions (frontward, rearward, leftward, and rightward), the operation portions being provided at the respective projecting pieces of the cross which are arranged at intervals of 90°. One of the frontward, rearward, leftward and rightward directions is selected by a player pushing down the corresponding one of the operation portions of the cross key 72a. For example, by a player operating the cross key 72a, a movement direction of a player object or the like appearing in the virtual game world can be specified, or one can be selected and specified from a plurality of options.

The operation buttons 72b to 72g output operation signals assigned to the respective operation buttons 72b to 72g when a player pushes down the head portions of the respective buttons. For example, functions of a 1st button, a 2nd button, an A button and the like are assigned to the operation buttons 72b to 72d. Functions of a minus button, a home button, a plus button and the like are assigned to the operation buttons 72e to 72g. The operation buttons 72a to 72g are assigned the respective functions, depending on a game program executed by the game apparatus 3. The operation button 72f is a button of a type whose upper surface is buried below the upper surface of the housing 71 so that the player is prevented from unintentionally and erroneously pushing down the button.

The operation button 72h is a power supply switch which remotely switches ON/OFF a power supply for the game apparatus 3. The operation button 72h, whose upper surface is buried below the upper surface of the housing 71, is a button of the same type as the operation button 72f.

In addition to the operation portion 72, a plurality of LEDs 702 are provided on the upper surface of the housing 71. Here, the controller 7 is assigned controller identification (number) so as to distinguish it from other controllers 7. For example, the LEDs 702 are used so as to notify a player of the controller identification currently set for the controller 7. Specifically, when transmission data is transmitted from the controller 7 to the wireless controller module 19 (see FIG. 2), one of the LEDs 702 is turned ON, depending on the controller identification.

Also, sound holes, through which sound is emitted from the loudspeaker 706 (see FIG. 5) built in the housing 71 to the outside, are formed between the operation button 72b and the operation buttons 72e to 72g on the upper surface of the housing 71.

As shown in FIG. 4, a hollow portion is formed on a lower surface of the housing 71. The hollow portion on the lower surface of the housing 71 is formed at a position where the index finger or the middle finger of a player is placed when the player holds the controller 7 with one hand while directing the front surface of the controller 7 toward the markers 6L and 6R. An operation button 72i is provided on a slope surface closer to the rear surface the hollow portion. The operation button 72i outputs an operation signal assigned thereto when a player pushing down the head portion of the operation button 72i, and functions as, for example, a B button.

An image capturing element 743 (see FIG. 5) which is a part of an image capture information computing section 74 (see FIG. 5) is provided on a front surface of the housing 71. Here, the image capture information computing section 74 is a system for analyzing image data of an image captured by the controller 7 to determine a place having a high luminance in the image data and detect a center-of-gravity position, a size, or the like of the place. The image capture information computing section 74 has, for example, a maximum sampling cycle of about 200 frames/sec, and therefore, can track and analyze a relatively high-speed movement of the controller 7. A detailed structure of the image capture information computing section 74 will be described below. A connector 73 is provided on a rear surface of the housing 71. The connector 73 is, for example, an edge connector which is utilized so as to engage and connect the controller 7 with a connection cable.

Figure 5:
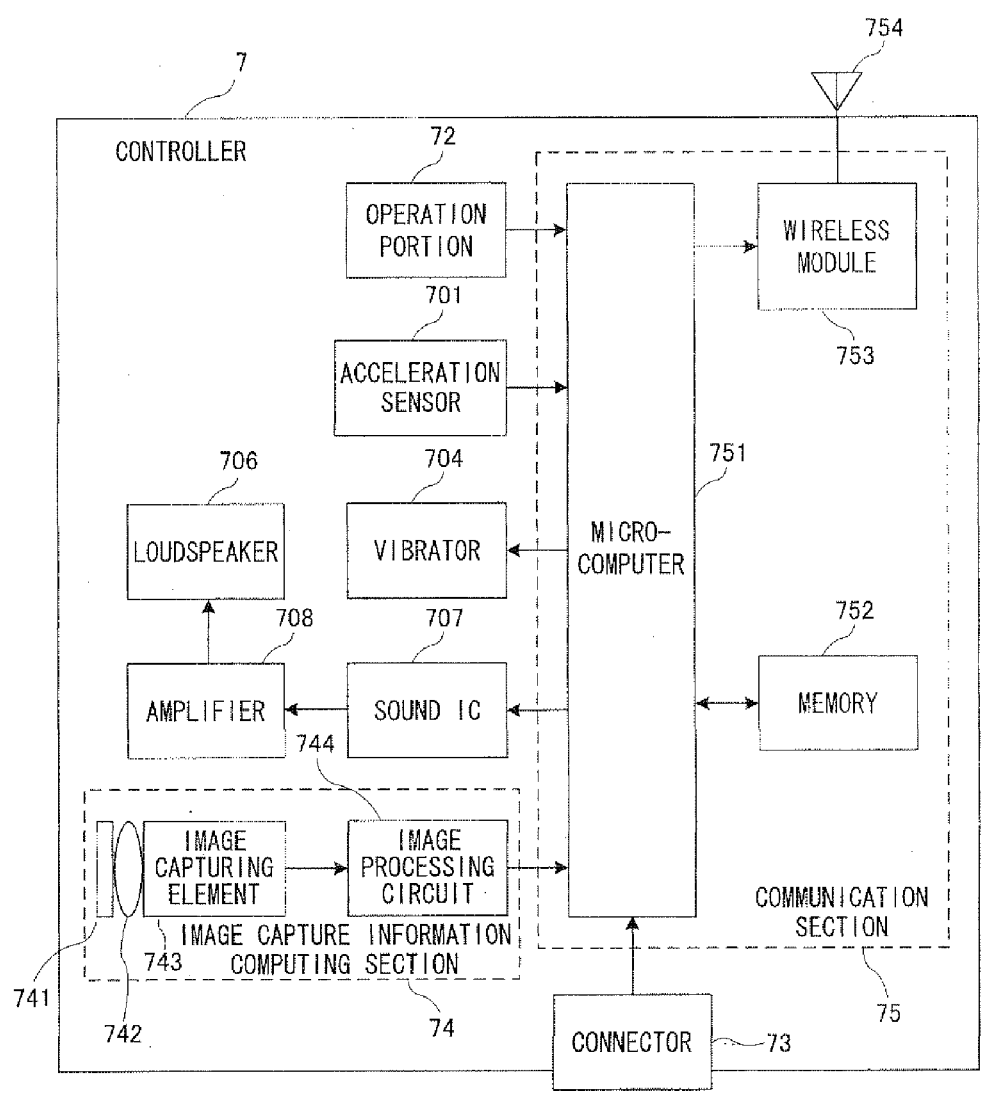
FIG. 5 is a block diagram showing a configuration of the controller 7.

Next, an internal structure of the controller 7 will be described with reference to FIG. 5. FIG. 5 is a block diagram showing the configuration of the controller 7.

As shown in FIG. 5, the controller 7 has, in addition to the above-described operation portion 72, the image capture information computing section 74, an acceleration sensor 701, a vibrator 704, a loudspeaker 706, a sound IC 707, an amplifier 708, and a communication section 75.

The image capture information computing section 74 includes an infrared filter 741, a lens 742, the image capturing element 743, and an image processing circuit 744. The infrared filter 741 allows, among lights incident on the front surface of the controller 7, only an infrared light to pass therethrough. The lens 742 converges the infrared light which has passed through the infrared filter 741, and outputs the infrared light to image capturing element 743. The image capturing element 743 is a solid-state image capturing element such as a CMOS sensor or a CCD. The image capturing element 743 takes an image of the infrared light converged by the lens 742. In other words, the image capturing element 743 takes an image of only the infrared light which has passed through the infrared filter 741. Then, the image capturing element 743 generates image data of the image. The image data generated by the image capturing element 743 is processed by the image processing circuit 744. More specifically, the image processing circuit 744 processes the image data obtained from the image capturing element 743, detects an area of the image which has a high brightness, and outputs to the communication section 75 process result data indicating a result of the detection of a coordinate position and a square measure of the area. The image capture information computing section 74 is fixed to the housing 71 of the controller 7. An imaging direction of the image capture information computing section 74 can be changed by changing a facing direction of the housing 71.

The acceleration sensor 701 is a triaxial (X-axis, Y-axis, and Z-axis shown in FIG. 3) acceleration sensor. The acceleration sensor 701 senses linear acceleration in three directions, i.e., an up-down direction (the Y-axis shown in FIG. 3), a left-right direction (the X-axis direction shown in FIG. 3), and a front-rear direction (the Z-axis direction shown in FIG. 3).

The communication section 75 includes a microcomputer 751, a memory 752, a wireless module 753, and the antenna 754. The microcomputer 751 controls the wireless module 753 for wirelessly transmitting transmission data while using the memory 752 as a storage area during a process. Also, the microcomputer 751 controls operations of the sound IC 707 and the vibrator 704, depending on data from the game apparatus 3 which is received by the wireless module 753 via the antenna 754. Since the controller 7 includes the wireless module 753 and the antenna 754, the controller 7 functions as a wireless controller.

The sound IC 707 processes sound data or the like transmitted from the game apparatus 3 via the communication section 75. The sound data is amplified by the amplifier 708 and transmitted to the loudspeaker 706, so that voice is outputted from the loudspeaker 706. The vibrator 704 is, for example, a vibration motor or a solenoid. The vibrator 704 is actuated in accordance with vibration data (e.g. a signal for turning ON or OFF the vibrator 704), or the like, transmitted from the game apparatus 3 via the communication section 75. The activation of the vibrator 704 generates vibration in the controller 7, so that the vibration is transferred to a player's hand holding the controller 7, thereby making it possible to achieve a so-called vibration-feature supporting game.

An operation signal (key data) from the operation portion 72 provided in the controller 7, triaxial acceleration signals (X-, Y-, and Z-axis direction acceleration data) from the acceleration sensor 701, and process result data from the image capture information computing section 74, are outputted to the microcomputer 751. The microcomputer 751 temporarily stores the inputted data (the key data, the X-, Y-, and Z-axis direction acceleration data, and the process result data), as transmission data to be transmitted to the wireless controller module 19 (see FIG. 2), into the memory 752. Here, wireless transmission from the communication section 75 to the wireless controller module 19 is performed in predetermined cycles. Since a game is generally processed in units of 1/60 sec, the cycle of the wireless transmission needs to be shorter than 1/60 sec. Specifically, the game processing unit is 16.7 ms (1/60 sec), and the transmission interval of the communication section 75 employing Bluetooth (registered trademark) is 5 ms. When timing of transmission to the wireless controller module 19 arrives, the microcomputer 751 outputs operation information stored in the memory 752, as a series of pieces of operation data, to the wireless module 753. Thereafter, the wireless module 753 emits, from the antenna 754, a wireless signal indicative of the operation data using a carrier wave having a predetermined frequency, by means of, for example, the Bluetooth (registered trademark) technique. Specifically, the key data from the operation portion 72 provided in the controller 7, the X-, Y-, and Z-axis direction acceleration data from the acceleration sensor 701, and the process result data from the image capture information computing section 74 are transmitted from the controller 7. Thereafter, the wireless controller module 19 of the game apparatus 3 receives the wireless signal (operation data), and the game apparatus 3 demodulates or decodes the wireless signal, thereby obtaining a series of pieces of operation information (the key data, the X-, Y- and Z-axis direction acceleration data, and the process result data). Thereafter, the CPU 10 of the game apparatus 3 performs a game process based on the obtained operation information and the game program.

Note that the aforementioned hardware configuration is only for illustrative purposes. The configurations of the game apparatus 3 and the controller 7 can be appropriately changed.

[Outline of Game]

Figure 6:
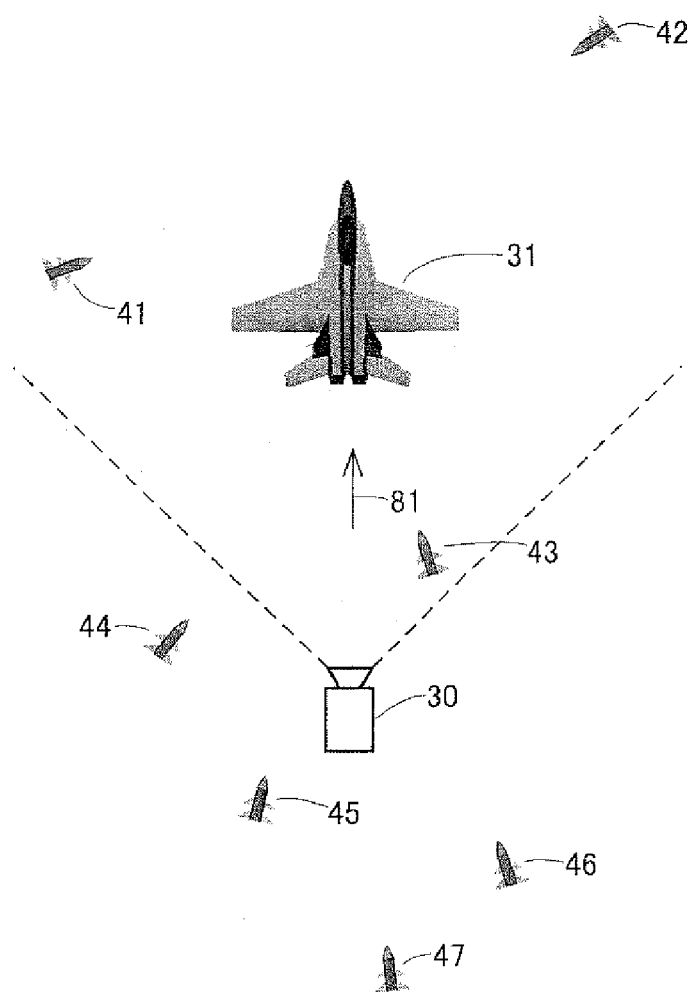
FIG. 6 schematically shows a virtual game space.

Next, an outline of a shooting game, which is advanced by the CPU 10 of the game apparatus 3 executing the game program, will be described. FIG. 6 schematically shows the virtual game space. As shown in FIG. 6, a player object 31 (an example of a first object), missiles 41 to 47 (an example of a second object), and the virtual camera 30 exist in the virtual game space. The player object 31 is an object that moves within the virtual game space in accordance with an operation performed by the player on the controller 7. The missiles 41 to 47 are missiles launched from an enemy object (not shown) which tries to attack the player object. The missiles 41 to 47 are so-called non-player objects. A viewpoint position, a viewing angle, a position coordinate, a movement velocity, and the like, of the virtual camera 30 are controlled such that the virtual camera 30 can observe the player object 31 while keeping a predetermined distance from the player object 31. As a result, an image of the virtual game space showing the player object 31 seen from the viewpoint of the virtual camera 30 is displayed on the screen of the liquid crystal television 2. Since the player object 31 is observed by the virtual camera 30, the player object 31 is displayed at a central portion of the screen of the liquid crystal television 2. Not only the player object 31 and the missiles 41 to 47, but also the enemy object which has launched the missiles 41 to 47 and a landform object such as a ground surface and a sea, exist within the virtual game space. However, these objects are omitted in the diagrams schematically showing the virtual game space in FIG. 6 and subsequent drawings. In the present embodiment, a case where the shooting game is executed based on the game program, is described. However, the present invention is applicable to other games such as an action game, as long as an image of an object within the virtual game space being seen from a viewpoint of a virtual camera (third-person viewpoint) is displayed in the game.

As shown in FIG. 6, among the missiles 41 to 47, the missiles 41 to 43 are within a field of view of the virtual camera 30. Accordingly, if a conventional drawing method is adopted, the missiles 44 to 47, which exist outside the field of view of the virtual camera 30, cannot be displayed together with the player object 31 on the screen of the liquid crystal television 2. On the other hand, a main feature of the game apparatus 3 according to the present embodiment is that the missiles 44, 45, and 47, which ordinarily should not be displayed on the screen of the liquid crystal television 2, can be displayed. Hereinafter, a configuration of the game apparatus 3 and a process performed in the game apparatus 3, for enabling the missiles 44, 45, and 47 to be displayed, will be described in detail.

[Main Data]

Figure 7:
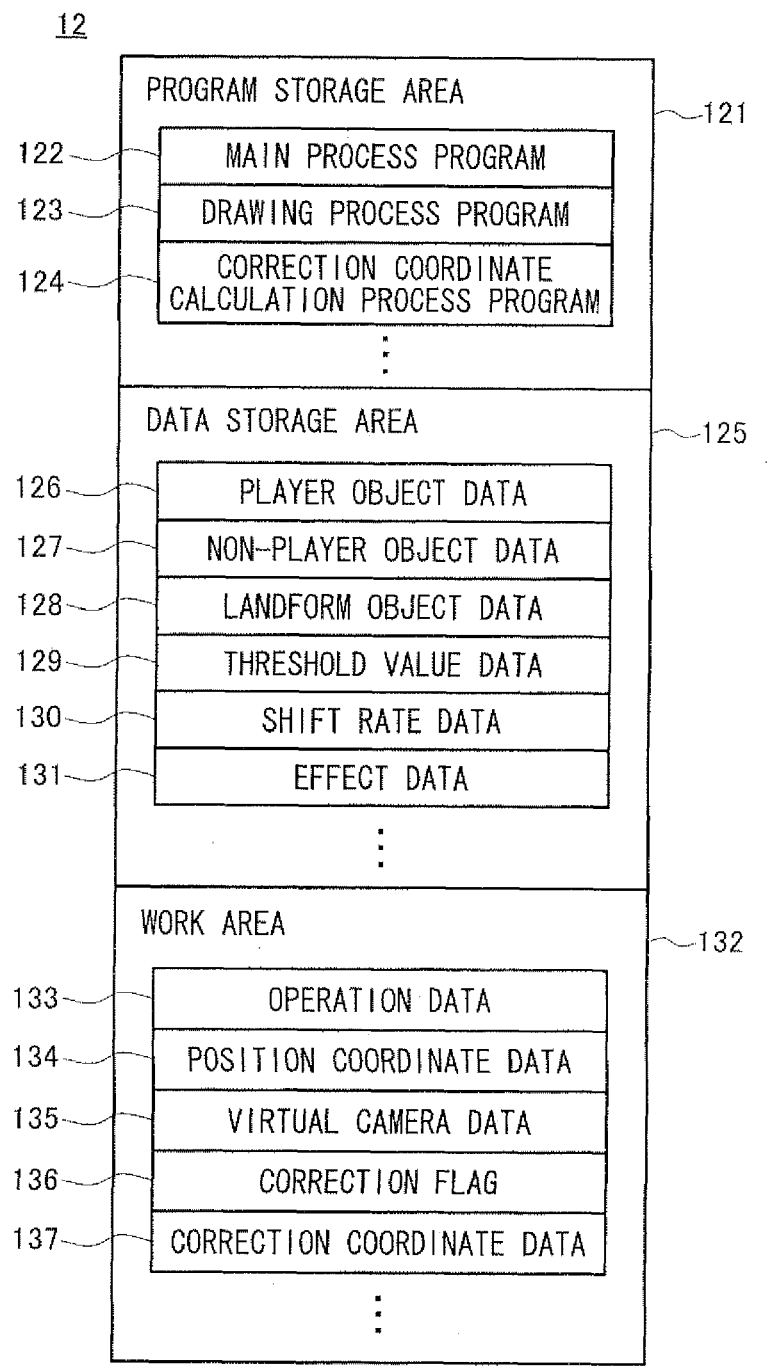
FIG. 7 shows an exemplary memory configuration of an external main memory 12.

FIG. 7 shows an exemplary memory configuration of the external main memory 12. As shown in FIG. 7, the external main memory 12 has a program storage area 121, a data storage area 125, and a work area 132. The program storage area 121 stores therein a game program which is executed by the CPU 10. Data stored in the program storage area 121 and the data storage area 125 are data which is stored in advance in the optical disc 4 and read out from the optical disc 4 into the external main memory 12 at the time of the game process.

The program storage area 121 stores therein a main process program 122, a drawing process program 123, and a correction coordinate calculation process program 124. The main process program 122 is a program for causing the CPU 10 to execute a main process shown in FIG. 12 which will be described later. The drawing process program 123 is a program for causing the CPU 10 to execute a drawing process shown in FIG. 13 which will be described later. The correction coordinate calculation process program 124 is a program for causing the CPU 10 to execute a correction coordinate calculation process shown in FIG. 14 which will be described later.

The data storage area 125 stores therein player object data 126, non-player object data 127, landform object data 128, threshold value data 129, shift rate data 130, and effect data 131.

The player object data 126 is data concerning the player object 31, and includes modeling data, texture data (RGB value), and the like, of the player object 31. The non-player object data 127 is data concerning the non-player object such as the missiles 41 to 47 and the enemy object, and includes modeling data, texture data (RGB value), and the like, of the non-player object. The landform object data 128 is data concerning various landform elements such as the ground surface, the sea, and a river within the virtual game space. The effect data 131 is image data used for various effects during the game. An example of the effect data 131 is image data showing that the missile 41 hits the player object 31.

The threshold value data 129 is data indicating a threshold value used in the correction coordinate calculation process of FIG. 14 which will be described later. At the time of the correction coordinate calculation process, the threshold value data 129 is, as appropriate, read out from the data storage area 125. The shift rate data 130 is data for defining a rate of shifting the missiles 44 to 47, which are not within the field of view of the virtual camera 30, in an image capturing direction 81 (see FIG. 6) of the virtual camera 30. Similarly to the threshold value data 129, the shift rate data 130 is data used in the correction coordinate calculation process. At the time of the correction coordinate calculation process, the shift rate data 130 is, as appropriate, read out together with the threshold value data 129.

The work area 132 is a storage area for temporarily storing therein data generated in the game process. In the work area 132, operation data 133, position coordinate data 134, virtual camera data 135, correction flags 136, and correction coordinate data 137 are stored.

The operation data 133 is the operation data transmitted from the controller 7 to the game apparatus 3. The operation data is transmitted from the controller 7 to the game apparatus 3 every 5 ms. Therefore, each time the game apparatus 3 receives the operation data transmitted from the controller 7, the operation data 133 is updated.

The position coordinate data 134 is data indicating position coordinates, in the virtual game space, of various objects such as the player object 30 and the missiles 41 to 47. The position coordinate data 134 is, for example, data of a coordinate represented by a world coordinate system. Based on these position coordinates of the various objects, the general game process such as a determination of contact between the player object 30 and the missiles 41 to 47 is performed. As data concerning each object, data indicating a direction in which each object moves, data indicating an amount by which each object moves per one frame, and the like, are stored in the work area 132, though not shown in the drawings.

The virtual camera data 135 is data concerning the virtual camera 30, and includes data indicating the viewpoint position of the virtual camera 30, data indicating the image capturing direction 81 of the virtual camera 30, data indicating an elevation angle of the virtual camera 30, and the like.

The correction flag 136 is data for indicating that an object should be located within the field of view of the virtual camera 30. In the work area 132, the correction flag 136 is stored so as to correspond to each of the objects other than the player object 31 which exist within the virtual game space. For example, it is sometimes necessary that the non-player object such as the missiles 41 to 47 and the enemy object, which is approaching or attacking the player object 31, is located within the field of view of the virtual camera 30. This is because, if a non-player object which is not within the field of view of the virtual camera 30 is not displayed on the screen of the liquid crystal television 2 even through the non-player object is located near the player object 31, the player may be disadvantaged. Accordingly, in the present embodiment, the correction flag 136 for the non-player object is set to be "1". On the other hand, other objects such as the landform object, which becomes away from the player object 31 when the game advances, do not approach or attack the player object 31, and therefore need not always be within the field of view of the virtual camera 30. Thus, in the present embodiment, the correction flag 136 for the other objects such as the landform object is set to be "0". However, even though a wall object is the landform object, the correction flag 136 for the wall object is set to be "1", because if, for example, the wall object approaches the player object 31 and crashes into the player object 31, the player object 31 is damaged. In this manner, setting of the correction flag 136 is appropriated set in accordance with a content of the game.

The correction coordinate data 137 is data indicating the correction coordinate for locating the object, for which the correction flag 136 is set to be "1", within the field of view of the virtual camera 30 when the image of the virtual game space is drawn. As will be described in detail later, an object (such as the player object 31 and the missiles 41 and 42) of which the correction coordinate data 137 is not stored is displayed on the screen of the liquid crystal television 2 while being located at the position coordinate indicated by the position coordinate data 134, and an object (such as the missiles 43 to 47) of which the correction coordinate data 137 is stored is displayed on the screen of the liquid crystal television 2 while being located at the correction coordinate indicated by the correction coordinate data 137. An object which is, even at the correction coordinate, not within the field of view of the virtual camera 30 is not displayed on the liquid crystal television 2.

The above-described main data may be stored in the internal main memory 11e instead of the external main memory 12, or alternatively may be stored in both the external main memory 12 and the internal main memory 11e.

[Functional Configuration of Game Apparatus 3]

FIG. 8 is a function block diagram showing an exemplary functional configuration of the game apparatus 3 which executes the game program according to the present embodiment. As shown in FIG. 8, the CPU 10 of the game apparatus 3 functionally includes an input reception section 101 that functions as input reception means, a position coordinate calculation section 102 that functions as position coordinate calculation means, a coordinate determination section 103 that functions as coordinate determination means, a correction coordinate calculation section 104 that functions as correction coordinate calculation means, and a display section 105 that functions as display means.

The CPU 10 of the game apparatus 3 executes the game program stored in advance in the optical disc 4 or the like, thereby functioning as the input reception section 101, the position coordinate calculation section 102, the coordinate determination section 103, the correction coordinate calculation section 104, and the display section 105. Hereinafter, a process performed by each functional section will be described, taking as an example the case where the player object 31 and the missiles 41 to 47 exist within the virtual game space as shown in FIG. 6.

The input reception section 101 receives an input of the operation information from the controller 7. Specifically, the input reception section 101 receives, by means of the wireless controller module 19, a wireless signal transmitted from the controller 7, and stores operation information obtained by demodulating or decoding the wireless signal, as the operation data 133, into the work area 132 (see FIG. 7).

The position coordinate calculation section 102 calculates position coordinates, in the virtual game space, of the player object 31, the missiles 41 to 47, and the viewpoint of the virtual camera 30. As described above, operation data transmitted from the controller 7 by the player operating the controller 7 is stored, as the operation data 133, in the work area 132 by the input reception section 101. The position coordinate calculation section 102 calculates a position coordinate of the player object 31, based on the operation information indicated by the operation data 133 which is received by the input reception section 101. The position coordinate of the player object 31 and the position coordinates of the missiles 41 to 47 are, as the position coordinate data 134, stored in the work area 132. While the operation data 133 is updated each time operation data is transmitted from the controller 7 (at intervals of 5 ms for example), the position coordinate data 134 is updated per frame (at intervals of 1/60 sec for example) based on the most recent operation data 133.

Figure 9A:
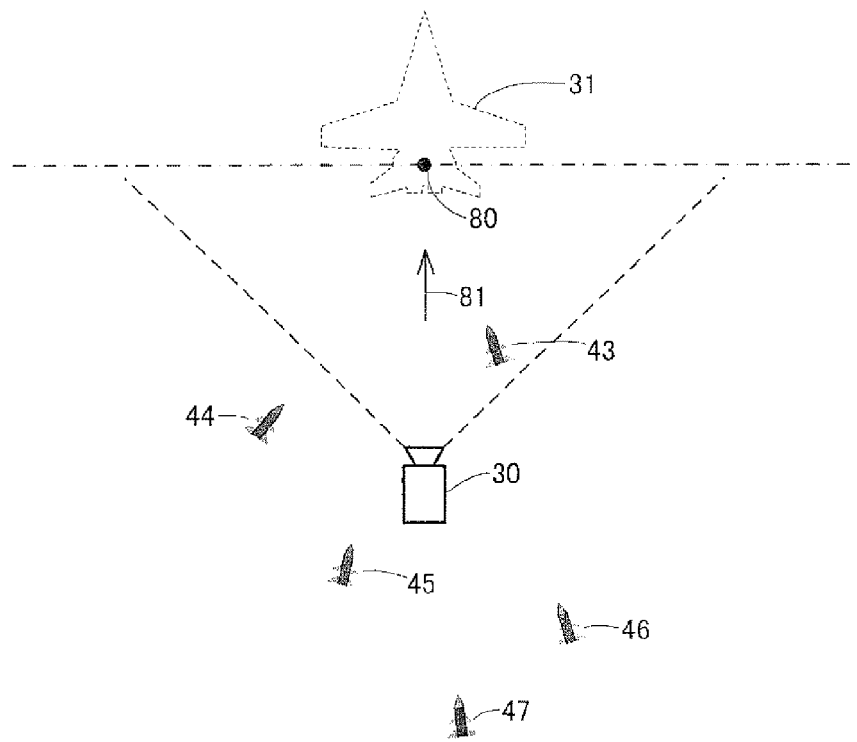
FIGS. 9A and 9B are diagrams for explaining a determination process performed by a coordinate determination section 103.

The coordinate determination section 103 determines whether or not each of the missiles 41 to 47 is located on a side of the virtual camera 30 relative to the player object 31 with respect to the image capturing direction 81 of the virtual camera 30. FIGS. 9A and 9S are diagrams for explaining a determination process performed by the coordinate determination section 103. As shown in FIG. 6 and FIG. 9A, the coordinate determination section 103 performs the determination process of whether or not each of the non-player objects (the missiles 41 to 47) is located on the side of the virtual camera 30 relative to a position coordinate (an exemplary predetermined point) of a center-of gravity position of the player object 31 with respect to the image capturing direction 81 of the virtual camera 30. In a state of the virtual game space shown in FIG. 6, it is determined that the missiles 41 and 42 are not located on the side of the virtual camera 30 relative to the player object 31, and it is determined that the missiles 43 to 47 are located on the side of the virtual camera 30 relative to the player object 31 (see FIG. 9A). For easily performing the determination process, in the present embodiment, the coordinate determination section 103 includes a vector calculation section 1031, an inner product calculation section 1032, and a vector determination section 1033.

Based on the position coordinates of the missiles 41 to 47 calculated by the position coordinate calculation section 102, the vector calculation section 1031 calculates an object orientation vector V1 and a camera orientation vector V2 for each of the objects (the missiles 41 to 47). Here, the camera orientation vector V2 is a vector of which the initial point is the position of the virtual camera 30 (for example, the viewpoint of the virtual camera 30) and the endpoint is the position coordinate of the player object 31. The object orientation vector V1 is a vector of which the initial point is the position coordinate of the player object 31 and the endpoint is the position coordinate of the non-player object (for example, the missile 44).

Figure 9B:
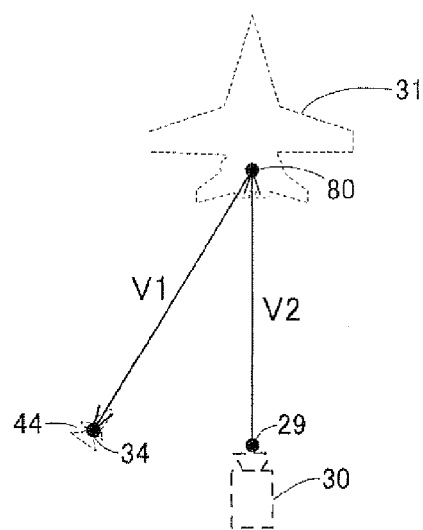

To calculate the vectors V1 and V2 of the missile 44, the vector calculation section 1031 calculates the camera orientation vector V2 of which the initial point is a position coordinate 29 of the viewpoint of the virtual camera 30 and the end point is the position coordinate 80 of the player object 31 as shown in FIG. 9B, based on the position coordinate 29 of the viewpoint of the virtual camera 30 and the position coordinate 80 of the player object 31 which have been calculated by the position coordinate calculation section 102. Then, the vector calculation section 1031 calculates the object orientation vector V1 of the missile 44 of which the initial point is the position coordinate 80 of the player object 31 and the end point is the position coordinate 34 of the missile 44, based on the position coordinate 80 of the player object 31 and the position coordinate 34 of the missile 44 which have been calculated by the position coordinate calculation section 102. Here, the case where the object orientation vector V1 of the missile 44 is calculated is taken as an example. However, the object orientation vectors V1 of the missile 43 and the missiles 45 to 47 are calculated in the same manner. Additionally, here, the case where the initial point of the camera orientation vector V2 is the position coordinate 29 of the viewpoint of the virtual camera 30 is taken as an example. However, the initial point of the camera orientation vector V2 may be another position in the virtual camera 30.

The inner product calculation section 1032 calculates, for each of the missiles 41 to 47, an inner product of the camera orientation vector V2 and the object orientation vector V1. Thereby, a distance from the position coordinate 80 of the player object 31 to the position coordinate of each non-player object with respect to the image capturing direction 81 of the virtual camera 30, can be obtained.

The vector determination section 1033 determines whether or not the non-player object is located on the side of the virtual camera 30 relative to the player object 31, based on a magnitude relation between the inner product calculated by the inner product calculation section 1032 and the threshold value (an exemplary predetermined threshold value) indicated by the threshold value data 129 (see FIG. 7) which is stored in the data storage area 125. In the present embodiment, the threshold value data 129 indicating "0" as the threshold value is stored in the data storage area 125. Therefore, the vector determination section 1033 determines whether or not the non-player object is located on the side of the virtual camera 30 relative to the player object 31, based on whether or not the inner product calculated by the inner product calculation section 1032 is less than "0".

In a case of the missile 44 for example, since an angle formed between the camera orientation vector V2 and the object orientation vector V1 is equal to or larger than 90 degrees, the inner product for the missile 44, that is, a distance from the position coordinate 80 to the position coordinate 34 in the image capturing direction 81 of the virtual camera 30 becomes negative. Accordingly, the vector determination section 1033 determines that the missile 44 is located on the side of the virtual camera 30 relative to the position coordinate 80 of the player object 31.

As for each of the missile 43 and the missiles 45 to 47, an angle formed between the camera orientation vector V2 and the object orientation vector V1 is equal to or larger than 90 degrees, and therefore, similarly to the missile 44, it is determined that the missile 43 and the missiles 45 to 47 are located on the side of the virtual camera 30 relative to the position coordinate 80 of the player object 31. On the other hand, as for each of the missiles 41 and 42, an angle formed between the camera orientation vector V2 and the object orientation vector V1 is less than 90 degrees, and therefore an inner product of the vectors becomes positive. Accordingly, it is determined that the missiles 41 and 42 are not located on the side of the virtual camera 30 relative to the position coordinate 80 of the player object 31.

In this manner, the coordinate determination section 103 determines, for each non-player object, whether or not the non-player object is located on the side of the virtual camera 30 relative to the position coordinate 80 of the player object 31, based on the image capturing direction 81 of the virtual camera 30 and a direction from the position coordinate 80 of the player object 31 to the non-player object.

For each of the non-player objects (here, the missiles 43 to 47) which are determined by the coordinate determination section 103 to be located on the side of the virtual camera 30, the correction coordinate calculation section 104 calculates a correction coordinate which is obtained by shifting the position coordinate of each of the missiles 43 to 47 in the image capturing direction 81 of the virtual camera 30.

Here, in a case where the correction coordinate of the non-player object (for example, the missile 44) is located ahead (located at a position above the alternate long and short dash line shown in FIG. 9A) of the position coordinate 80 of the player object 31 with respect to the image capturing direction 81, the non-player object is displayed on the screen of the liquid crystal television 2 so as to be located ahead of the player object 31, although the non-player object should be located behind the player object 31. In order to avoid such an unnatural display, in the present embodiment, the correction coordinate calculation section 104 calculates, as the correction coordinate of the non-player object which has been determined to be located on the side of the virtual camera 30, a coordinate obtained by shifting the position coordinate of the non-player object to a position (a position below the alternate long and short dash line shown in FIG. 9A) on the side of the virtual camera 30 relative to the position coordinate 80 of the player object 31. In other words, the correction coordinate calculation section 104 calculates a correction coordinate such that the correction coordinate to be calculated is not located ahead (a position above the alternate long and short dash line shown in FIG. 9A) of the position coordinate 80 with respect to the image capturing direction 81.

Figure 10A:
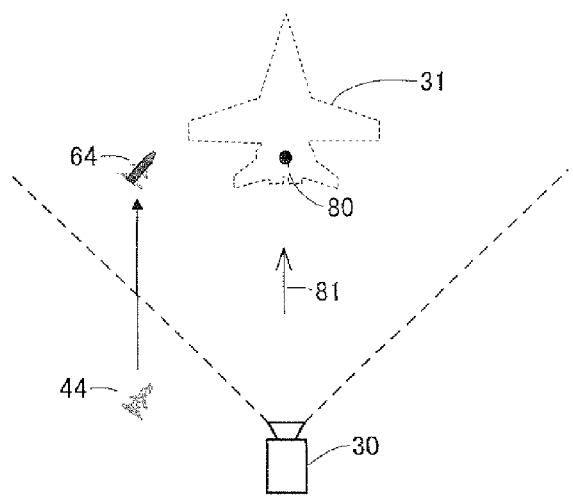
FIGS. 10A, 10B, and 10C are diagrams for explaining a method for calculating a correction coordinate of a non-player object.
Figure 10B:
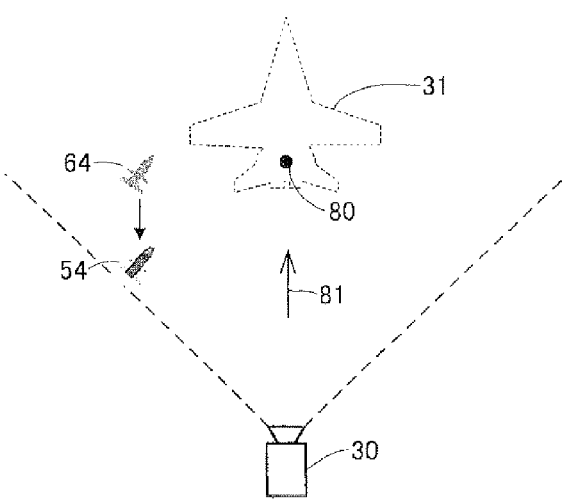
Figure 10C:
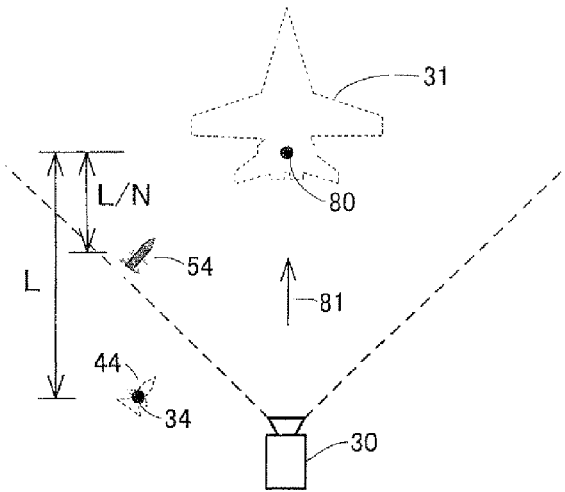

FIGS. 10A, 10B, and 10C are diagrams for explaining a method for calculating the correction coordinate of the non-player object. Hereinafter, a specific method for calculating the correction coordinate will be described with reference to FIGS. 10A, 10B, and 10C, taking the missile 44 as an example of the non-player object. The correction coordinate calculation section 104 performs a calculation process represented by the following Equation 1, in order to cancel, in the position coordinate of the non-player object of which the correction coordinate is to be calculated, a component in the image capturing direction 81 of the virtual camera 30.

$$P2 = P1 - V2 \times F \qquad \text{(Equation 1)}$$

In the Equation 1, P1 represents the position coordinate of the missile 44, V2 represents the camera orientation vector (see FIG. 9B), and F represents the inner product of the camera orientation vector V2 and the object orientation vector V1 (see FIG. 9B). P2 represents a provisional coordinate obtained by shifting the missile 44 to the position of the position coordinate 80 of the player object 31 with respect to the image capturing direction 81. In FIG. 10A, the position of the provisional coordinate is shown as a missile 64.

Then, the correction coordinate calculation section 104 performs a calculation process represented by the following Equation 2, in order to calculate a correction coordinate P3 of the missile 44 which is located at the position coordinate P1 in the virtual game space.

$$P3 = P2 + V2 \times F \times \frac{1}{N} \qquad \text{(Equation 2)}$$

In the Equation 2, P2 represents the provisional coordinate of the missile 44, V2 represents the camera orientation vector, F represents the inner product of the camera orientation vector V2 and the object orientation vector V1 (see FIG. 9B), and N represents a correction coefficient for defining the extent to which the correction coordinate is made close to the position coordinate 80 of the player object 31. By execution of the calculation process based on the Equation 2, as shown in FIG. 10B, the correction coordinate P3, which is a coordinate obtained by shifting the missile 44 (missile 64) located at the provisional coordinate P2 back to the side of the position coordinate P1, is calculated. FIG. 10B illustrates the missile 44 located at the correction coordinate 23, as a missile 54.

The correction coordinate calculation section 104 executes, for the missile 44, the calculation process based on the Equation 1 and the Equation 2. Thus, when the missile 44 is located at the correction coordinate P3, a distance from the position coordinate 80 to the missile 44 with respect to the image capturing direction 81 becomes L/N, while when the missile 44 is located at the position coordinate 21, a distance from the position coordinate 80 to the missile 44 with respect to the image capturing direction 81 is L (an example of a first distance). That is, the distance from the position coordinate 80 to the missile 44 with respect to the image capturing direction 81 is shortened, and a space on the side of the virtual camera 30 relative to the position coordinate 80 appears as if being compressed with reference to the position coordinate 80.

Figure 11:
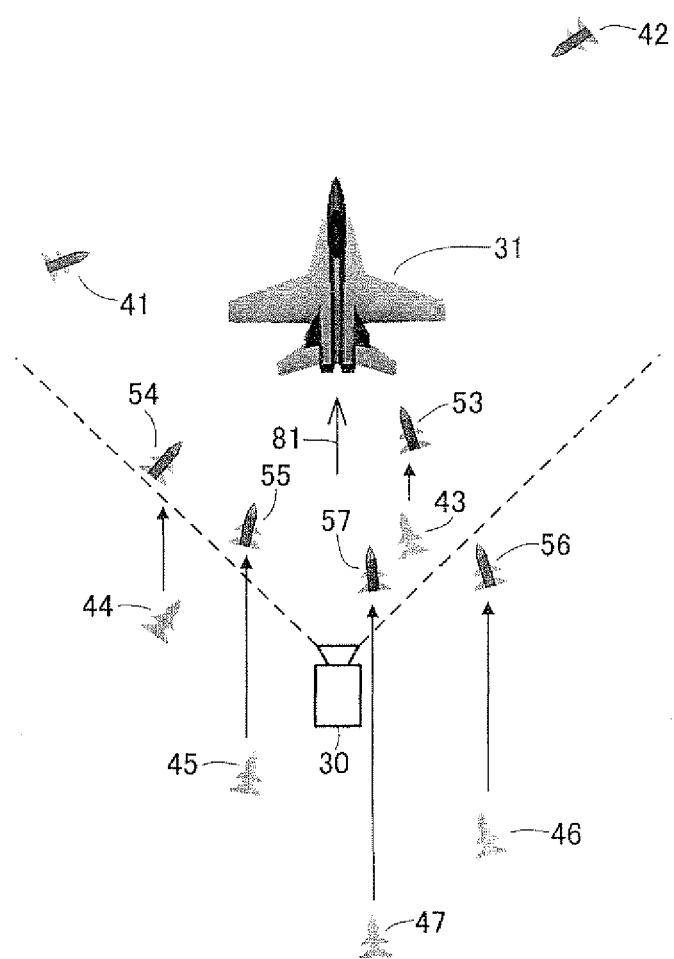
FIG. 11 schematically shows the virtual game space, illustrating a state where missiles 43 to 47 have been shifted in an image capturing direction 81.

FIG. 11 schematically shows the virtual game space, illustrating a state where the missiles 43 to 47 have been shifted in the image capturing direction 81. The correction coordinate calculation section 104 calculates a correction coordinate for each of the missiles 43 and the missiles 45 to 47, in the same manner as for the missile 44. FIG. 11 schematically shows a situation in which the missiles 43 to 47 are shifting from their original position coordinates to the positions of the correction coordinates calculated by the correction coordinate calculation section 104. In FIG. 11, the missile 43 located at the original position coordinate is shown as a missile 53 after the shift, the missile 44 located at the original position coordinate is shown as a missile 54 after the shift, the missile 45 located at the original position coordinate is shown as a missile 55 after the shift, the missile 46 located at the original position coordinate is shown as a missile 56 after the shift, and the missile 47 located at the original position coordinate is shown as a missile 57 after the shift. As clear from FIG. 11, the non-player objects (here, the missiles 44, 45, and 47) located outside the field of view of the virtual camera 30 are placed at the correction coordinates, and thereby included in the field of view of the virtual camera 30.

As described above, based on the distance (which is L in a case of the missile 44) from the position coordinate 80 of the player object 31 to the position coordinate of each non-player object with respect to the image capturing direction 81 of the virtual camera 30, the correction coordinate calculation section 104 calculates the correction coordinate for each non-player object in such a manner that the distance from the position coordinate 80 of the player object 31 to the correction coordinate of the non-player object with respect to the image capturing direction 81 of the virtual camera 30 is a predetermined ratio (1/N in the present embodiment) of the distance from the position coordinate of the player object 31 to the position coordinate of the non-player object with respect to the image capturing direction 81 of the virtual camera 30.

The missile 46 located outside the field of view of the virtual camera 30 is, even if located at the correction coordinate, not included in the field of view of the virtual camera 30. By increasing the value of the correction coefficient N in the aforesaid Equation 2, the correction coordinate of the missile 46 can be included in the field of view of the virtual camera 30. That is, the number of non-player objects included in the field of view of the virtual camera 30 can be increased. However, when the value of the correction coefficient N is excessively increased, the space behind the player abject 31 in the image capturing direction 81 is unnecessarily compressed, and each non-player object is displayed at a position considerably closer to the player object 30 than it really is, which causes significant unnaturality. Accordingly, in consideration of the above, the value of the correction coefficient N is set to be an appropriate value.

The display section 105 generates an image of a drawing space showing a state where: the player object 31 and the missiles 41 and 42, which are determined to be not located on the side of the virtual camera 30 relative to the position coordinate 80 of the player object 31, are located at their respective position coordinates; and the missiles 43 to 47, which are determined to be located on the side of the virtual camera 30 relative to the position coordinate 80 of the player object 31, are located at their respective correction coordinate. At this time, the display section 105 generates an image of the drawing space while defining the position coordinate or the correction coordinate of each object as the center-of-gravity coordinate of the object. Here, the drawing space is a virtual game space different from the virtual game space in which all the objects are located at their original position coordinates. In other words, the drawing space is a virtual game space in which objects that are originally not included in the field of view of the virtual camera 30 are located at their respective correction coordinates so as to be included in the field of view. The control of the position coordinate of each object, the determination of contact between objects, and the like, are performed on the virtual game space in which all the objects are located at their original position coordinates.

The display section 105 outputs the image data of the drawing space to the liquid crystal television 2, thereby displaying the image of the drawing space, as an image of the virtual game space, on the liquid crystal television 2. As a result, objects (here, the missiles 44, 45, and 47) which originally should not appear on the screen are displayed together with the player object 31.

[Main Process]

Next, the game process executed by the game apparatus 3 will be described. When power is applied to the game apparatus 3, the CPU 10 of the game apparatus 3 executes the boot program stored in the ROM/RTC 13. Thereby, each unit such as the external main memory 12 is initialized. Then, the game program stored in the optical disc 4 is read into the external main memory 12, and the CPU 10 starts to execute the game program.

Figure 12:
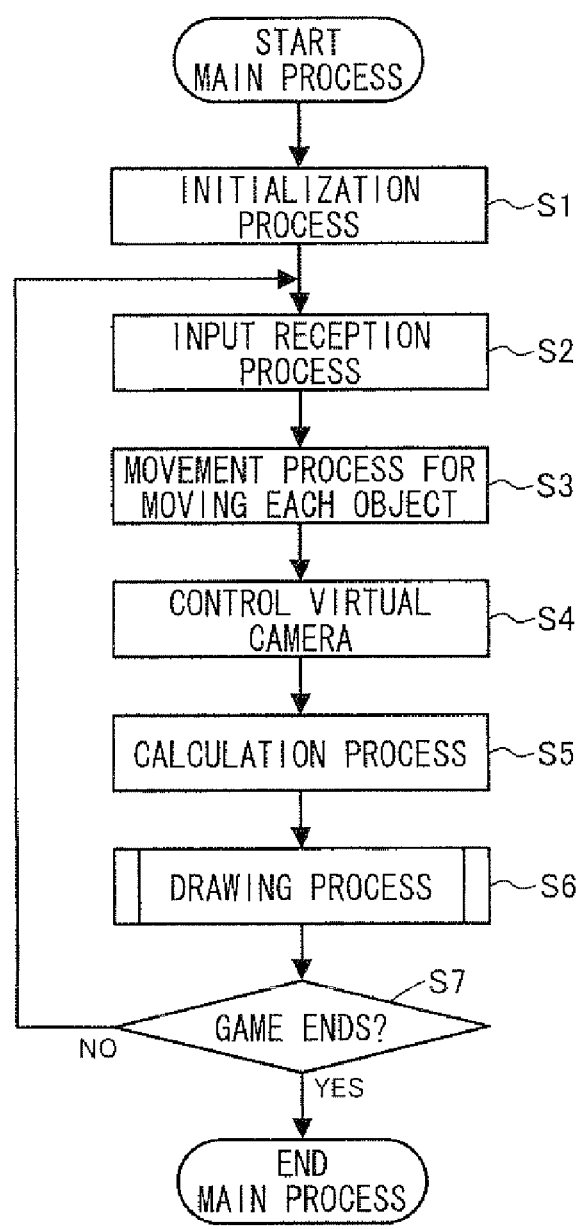
FIG. 12 is a flowchart showing an exemplary main process executed by the game apparatus 3.

FIG. 12 is a flowchart showing an exemplary main process executed by the game apparatus 3. Firstly, at step S1, the input reception section 101 executes an initialization process for initializing data which is used in subsequent processes. Specifically, data indicating an initial position of the virtual camera 30 and initial locations of various objects at the time of start of the game is stored in the external main memory 12. Additionally, various variables and flags in the work area 132 which are used in the subsequent processes are also initialized.

Subsequently, a three-dimensional virtual game space is constructed, and displayed on the liquid crystal television 2. That is, the CPU 10 constructs a three-dimensional virtual game space, and places each object in accordance with the data indicating the initial locations of the various objects. An image of the drawing space which is an image, captured by the virtual camera 30, of the game space constructed in the above-described manner is generated. The generated image is displayed on the liquid crystal television 2. Subsequently, a loop of processes at steps S2 to S7 is repeatedly performed, once in each frame (1/60 sec in the present embodiment). Thus, the game advances.

Following the initialization process at step S1, the input reception section 101 receives an input of operation information from the controller 7 (step S2). That is, the input reception section 101 acquires, from the controller 7, operation data indicating a content of an operation performed by the player. In response thereto, the position coordinate calculation section 102 performs a movement process for moving each object (step S3). Specifically, the position coordinate calculation section 102 moves, as appropriate, the objects other than the player object 31 within the virtual game space. Then, the position coordinate calculation section 102 moves the player object 30 within the virtual game space, in accordance with a content of the operation data (operation data 133).

Subsequently, the position coordinate calculation section 102 controls parameters concerning the virtual camera 30 (the position coordinate of the virtual camera 30, a distance from the player object 31, the image capturing direction 81, and the like) such that the virtual camera 30 observes the player object 31 moving within the virtual game space in accordance with operations on the controller 7 performed by the player (step S4).

Based on the processes at step S3 and step S4, the position coordinate calculation section 102 calculates position coordinates of the player object 31, the non-player objects such as the missiles 41 to 47, the landform object, and the like (step S5). The process for calculating the position coordinates is the same as the conventional method, and therefore a detailed description thereof is omitted here.

Then, the drawing process is performed for calculating correction coordinates of non-player objects which are not included in the field of view of the virtual camera 30 and displaying an image of the drawing space on the liquid crystal television 2 (step S6). The drawing process at step S6 will be described in detail based on FIG. 13. After the drawing process at step S6 is performed, the input reception section 101 determines whether or not the game ends, based on whether or not the power button 24, the reset button 25, or the operation button 72h are operated (step S7). When the input reception section 101 determines that the game does not end (step S7: NO), the game processes at step S2 and the subsequent steps are repeated. When the input reception section 101 determines that the game ends (step S7: YES), the game process is ended.

[Drawing Process]

Figure 13:
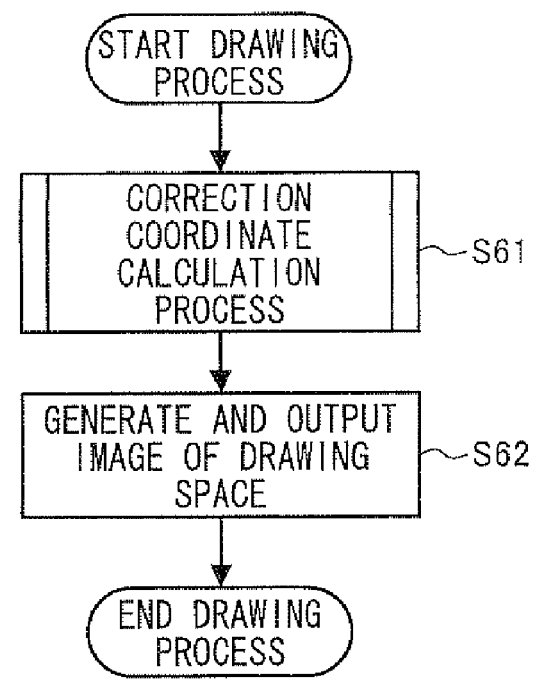
FIG. 13 is a flowchart showing, in detail, a drawing process at step S6 of FIG. 12.

FIG. 13 is a flowchart showing, in detail, the drawing process at step S6 of FIG. 12. When the position coordinate of each object is calculated at step S5, the correction coordinate calculation process, for calculating the correction coordinate of the non-player object that should be included in the field of view of the virtual camera 30, is performed (step S61). The correction coordinate calculation process will be described in detail based on FIG. 14.

When the correction coordinate of the non-player object that should be included in the field of view of the virtual camera 30 is calculated, the display section 105 generates an image of the drawing space, and outputs the image to the liquid crystal television 2 (step S62). Specifically, the display section 105 causes the GPU 11b to generate image data indicating an image of the drawing space which is captured by the virtual camera 30 and which shows a state where: the non-player objects (in the present embodiment, the missiles 41 and 42) of which the correction coordinates have not been calculated, and the player object 31 are located at their respective position coordinates; and the non-player objects (in the present embodiment, the missiles 43 to 47) of which the correction coordinates have been calculated are located at their respective correction coordinates. The display section 105 outputs the image data of the drawing space, which is generated in the above-described manner, to the liquid crystal television 2, and displays the image, as an image of the virtual game space, on the screen of the liquid crystal television 2.

[Correction Coordinate Calculation Process]

Figure 14:
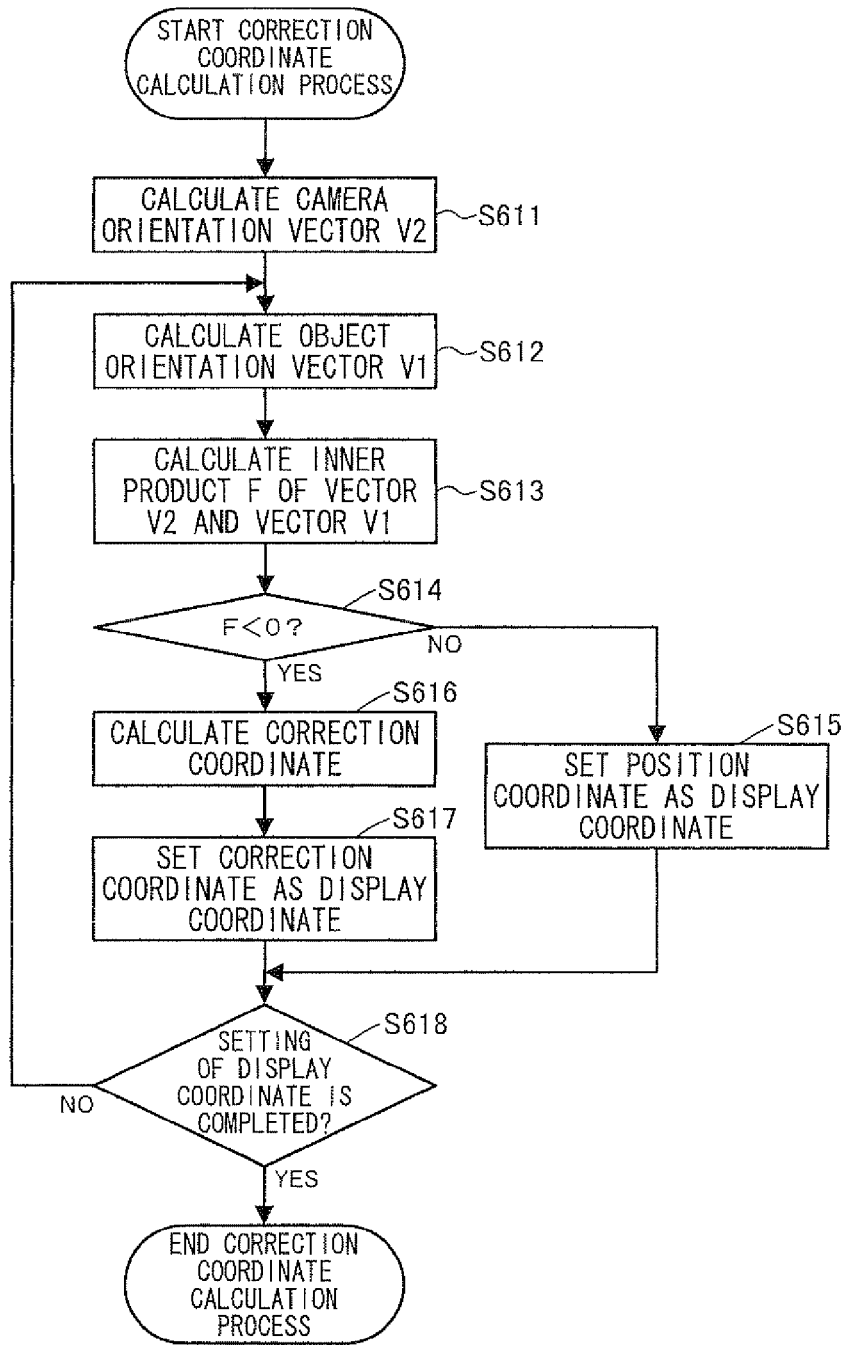
FIG. 14 is a flowchart showing, in detail, a correction coordinate calculation process at step S61 of FIG. 13.

FIG. 14 is a flowchart showing, in detail, the correction coordinate calculation process at step S61 of FIG. 13. As shown in FIG. 14, the vector calculation section 1031 calculates the camera orientation vector V2 (step S611). Specifically, the vector calculation section 1031 acquires the position coordinate 29 of the viewpoint of the virtual camera 30 and the position coordinate 80 of the center-of-gravity position of the player object 31, which have been calculated by the position coordinate calculation section 102. Then, the vector calculation section 1031 calculates the camera orientation vector V2 of which the initial point is the position coordinate 29 and the end point is the position coordinate 80 (see FIG. 9B).

Then, the vector calculation section 1031 calculates the object orientation vector V1 (step S612). Specifically, the vector calculation section 1031 acquires the position coordinate 80 of the center-of-gravity position of the player object 31 and the position coordinate of the non-player object (in the case of missile 44, the position coordinate 34), which have been calculated by the position coordinate calculation section 102. Then, the vector calculation section 1031 calculates the object orientation vector V1 of which the initial point is the position coordinate 80 and the endpoint is the position coordinate of the non-player object (see FIG. 9B).

When the object orientation vector V1 is calculated, the inner product calculation section 1032 calculates the inner product F of the camera orientation vector V2 and the object orientation vector V1 (step S613). In response thereto, the vector determination section 1033 reads out the threshold value data 129 (for example, "0") from the data storage area 125 and determines whether or not the inner product F calculated in the process at step S613 is less than the threshold value "0" indicated by the threshold value data 129 (step S614). By the process at step S614 being performed, whether or not the position coordinate of the non-player object, for which the object orientation vector V1 has been calculated in the process at step S612, is located on the side of the virtual camera 30 relative to the position coordinate 80 of the player object 31 with respect to the image capturing direction 81, is determined.

When the vector determination section 1033 determines that the inner product F is not less than "0" (step S614: NO), it can be determined that the corresponding non-player object is not located on the side of the virtual camera 30 relative to the position coordinate 80 of the player object 31 with respect to the image capturing direction 81. Therefore, the correction coordinate calculation section 104 sets the position coordinate of the corresponding non-player object which has been calculated in the calculation process at step S5, as a display coordinate for displaying the non-player object on the liquid crystal television 2 (step S615). This setting information is temporarily stored in the work area 132.

When the vector determination section 1033 determines that the inner product F is less than "0" (step S614: YES), it can be determined that the corresponding non-player object is located on the side of the virtual camera 30 relative to the position coordinate 80 of the player object 31 with respect to the image capturing direction 81. Therefore, at step S616, for the corresponding non-player object, the correction coordinate calculation section 104 calculates a correction coordinate by performing the calculation process represented by the Equation 1 and the Equation 2 described above, based on the position coordinate which has been calculated in the calculation process at step S5. Then, at step S617, the correction coordinate calculation section 104 sets the correction coordinate of the corresponding non-player object which has been calculated in the process at step S616, as a display coordinate for displaying the non-player object on the liquid crystal television 2. This setting information is temporarily stored in the work area 132. Note that, even if the correction coordinate is set as the display coordinate, a corresponding non-player object may not be displayed on the liquid crystal television 2 in a case where the correction coordinate is not located within the field of view of the virtual camera 30.

When the position coordinate is set as the display coordinate in the process at step S615, or when the correction coordinate is set as the display coordinate in the process at step S617, the coordinate determination section 103 determines whether or not a correction coordinate has been set as the display coordinate for each of the non-player objects for which the correction flags 136 are set to be "1" (step S618). When there is a non-player object for which the correction flag 136 is set to be "1" but nevertheless the correction coordinate is not set as the display coordinate (step S618: NO), the processes at step S612 and subsequent steps are performed for the non-player object. When setting of the display coordinates of all the non-player objects for which the correction flags 136 are set to be "1" is completed (step S618: YES), the process advances to step S62 of FIG. 13 described above. As a result, for example, an image of the drawing space which is captured by the virtual camera 30 and which shows a state where the player object 31 and the missiles 41 and 42 are located at their respective position coordinates, and the missiles 43 to 47 are located at their respective correction coordinates, is displayed on the screen of the liquid crystal television 2.

[Operations and Effects of the Present Embodiment]

As described above, according to the present embodiment, the image of the drawing space, showing a state where: the player object 31 and the missiles 41 and 42, which are not located on the side of the virtual camera 30 relative to the position coordinate 80 of the player object 31, are located at their respective position coordinates; and the missiles 43 to 47, which are located on the side of the virtual camera 30 relative to the position coordinate 80, are located at their respective correction coordinates, is displayed on the screen of the liquid crystal television 2. This enables a display of an image of the game space showing a state where the missiles 44, 45, and 47, which are located outside the field of view of the virtual camera 30 such as behind the virtual camera 30 in the image capturing direction 81, are included in the field of view of the virtual camera 30 (see FIG. 11). Accordingly, an object which could not appear on the screen by the conventional drawing method can be displayed without making the viewpoint of the virtual camera 30 further away from the player object 31 which is an observation target.

In the present embodiment, the correction coordinate, which is obtained by shifting the non-player object such as the missile 44 in the image capturing direction 81, is calculated. Therefore, the position of each non-player object on the screen does not change, and each non-player object can be displayed in a natural manner.

In the present embodiment, the correction coordinate of each non-player object is calculated such that the correction coordinate is located on the side of the virtual camera 30 relative to the position coordinate 80 of the player object 31. This can avoid an unnatural display such as a display in which the missile 43 located behind the player object 31 in the image capturing direction 81 is located ahead of the player object 31.

In the present embodiment, the correction coordinate is calculated based on the first distance (in the case of the missile 44, the distance L: see FIG. 100) from the position coordinate 80 of the player object 31 to the position coordinate of the non-player object in the image capturing direction 81. Therefore, the correction coordinate can easily be calculated.

In the present embodiment, the position coordinates of the missiles 43 to 47 are corrected at the same ratio. That is, a correction coordinate of each of the non-player objects (the missiles 43 to 47) is calculated such that a distance from the position coordinate 80 to the correction coordinate in the image capturing direction 81 is 1/N of the distance from the position coordinate 80 to the position coordinate of the non-player object in the image capturing direction 81. This can avoid an unnatural display such as a display in which the missile 45, which is farther from the player object 31 than the missile 44 is, is located at a position nearer to the player object 31 than the missile 44 is.

In the present embodiment, whether or not each non-player object is located on the side of the virtual camera 30 relative to the position coordinate 80 of the player object 31 with respect to the image capturing direction 81 is determined. This determination process can easily be performed, because only an image capturing direction component of the position coordinate of each non-player object may be used.

In the present embodiment, whether or not each non-player object is located on the side of the virtual camera 30 relative to the position coordinate 80 of the player object 31, is determined based on the inner product F of the camera orientation vector V2 and the object orientation vector V1 which have been calculated based on the image capturing direction 81 and an orientation from the position coordinate of the player object 31 to the position coordinate of the non-player object. Therefore, the determination process can easily be performed. Moreover, since whether or not each non-player object is located on the side of the virtual camera 30 relative to the position coordinate 80 of the player object 31, is determined based on a magnitude relation between the inner product F and the threshold value (in the present embodiment, "0"), the determination process can be performed accurately.

In the present embodiment, for each of the non-player objects not included in the field of view of the virtual camera 30, whether or not the non-player object is located on the side of the virtual camera 30 relative to the position coordinate 80 of the player object 31, is determined, and a correction coordinate is calculated as necessary. This can avoid an unnatural display such as a display in which, while the missile 47 farthest from the player object 31 is displayed on the screen of the liquid crystal television 2, the missile 44, which is nearer to the player object 31 than the missile 47 is, is not displayed.

In the present embodiment, the position coordinate 80 of the player object 31 is set as a predetermined point of the present invention. Therefore, a natural image can be displayed in which each non-player object is made closer to the player object 31, which should be observed by the virtual camera 30, in the image capturing direction 81.

In the present embodiment, the image of the drawing space which is different from the game space used for controlling a position of each object, determining a contact between objects, and the like, is displayed on the liquid crystal television 2. That is, when the image of the virtual game space is displayed on the liquid crystal television 2, the position coordinate of each object in the game space used for controlling a position of each object, determining a contact between objects, and the like, is not actually changed. Therefore, the image of the virtual game space showing a state where the non-player object located outside the field of view of the virtual camera 30 is included in the field of view, can be displayed without disturbing the game process which is generally performed in various games.

[Modification]

Figure 15A:
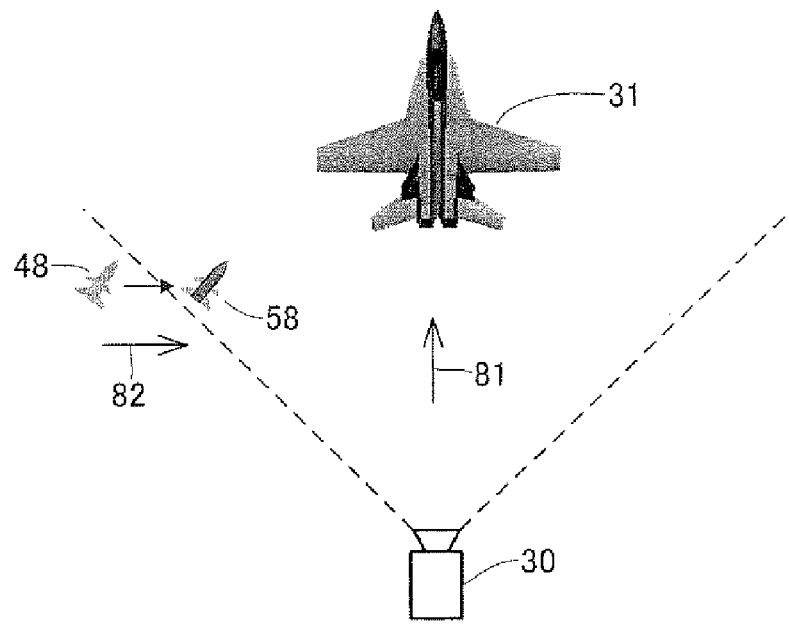
FIGS. 15A and 15B are diagrams for explaining modified examples of a direction in which the correction coordinate is shifted from the position coordinate.
Figure 15B:
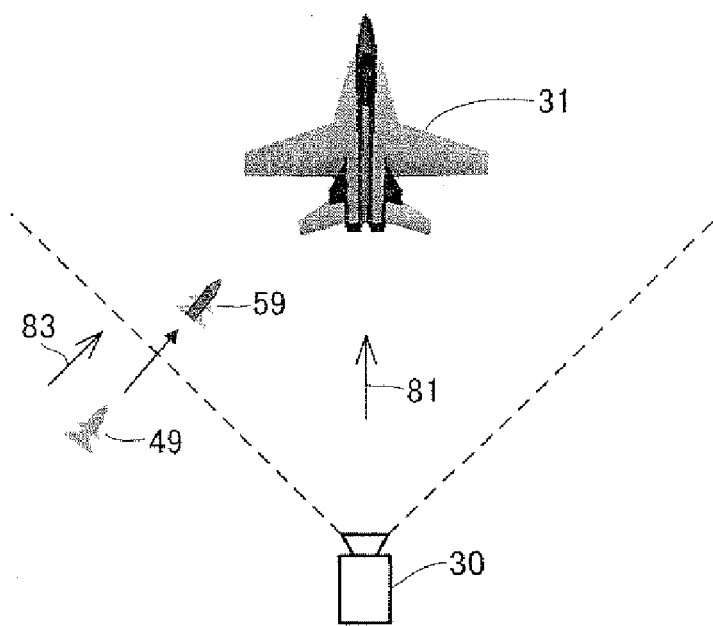

Hereinafter, a modification of the above-described embodiment will be described. FIGS. 15A and 15B are diagrams for explaining modified examples of the direction in which the correction coordinate is shifted from the position coordinate. As illustrated in FIG. 15A, in order that a missile 48 which is located outside the field of view of the virtual camera 30 can be displayed as a missile 58 located within the field of view on the screen of the liquid crystal television 2, a coordinate obtained by shifting the position coordinate of the missile 48 in a direction (rightward or leftward in FIG. 15) perpendicular to the image capturing direction 81 of the virtual camera 30 may be calculated as the correction coordinate of the missile 48.

As illustrated in FIG. 15B, in order that a missile 49 which is located outside the field of view of the virtual camera 30 can be displayed as a missile 59 which is at a position shifted from the missile 49 toward the player object 31 in a direction indicated by an arrow 83, a coordinate obtained by shifting the position coordinate of the missile 49 toward the player object 31 may be calculated as the correction coordinate of the missile 49. In this manner, by calculating the correction coordinate such that the non-player object is shifted toward the player object 31, an object such as the missile 46 (see FIG. 11) which cannot be included in the field of view of the virtual camera 30 even if the missile 46 is shifted in the image capturing direction 81, can be included in the field of view of the virtual camera 30 and can appear on the screen of the liquid crystal television 2.

Figure 16:
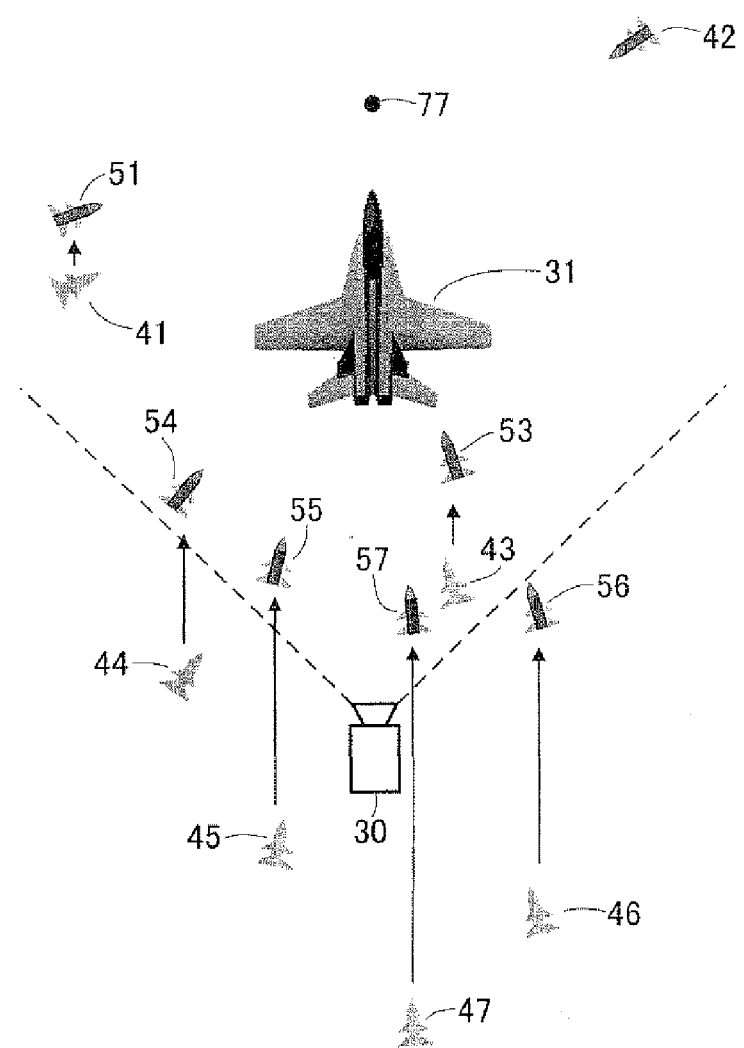
FIG. 16 is a diagram for explaining a positional relationship between the position coordinate and the correction coordinate in a case where an observed point 77 which is different from a position coordinate 80 of a player object 31 is defined as a predetermined point.

FIG. 16 is a diagram for explaining a positional relationship between the position coordinate and the correction coordinate in a case where an observed point 77 which is different from the position coordinate 80 of the player object 31 is defined as the predetermined point. As illustrated in FIG. 16, the virtual camera 30 is sometimes controlled so as to observe the observed point 77 (exemplified by the ground surface in front of the player object 31) while observing the player object 31. In this case, the observed point 77 is displayed at the center of the screen of the liquid crystal television 2, and the player object 31 is displayed immediately below the observed point 77. In this manner, when a control is performed such that the virtual camera 30 observes not only the player object 31 but also the observed point different from the player object 31, the coordinate determination section 103 may determine whether or not each non-player object is located on the side of the virtual camera 30 relative to the observed point 77. In a case of such a determination, the missile 41, which in the above-described embodiment would be determined to be not located on the side of the virtual camera 30 relative to the position coordinate 80 of the player object 31, is determined to be located on the side of the virtual camera 30 relative to the observed point 77. Thus, the missile 41 is made closer to the observed point 77, and, in this state, displayed as a missile 51 on the screen of the liquid crystal television 2.

Figure 17:
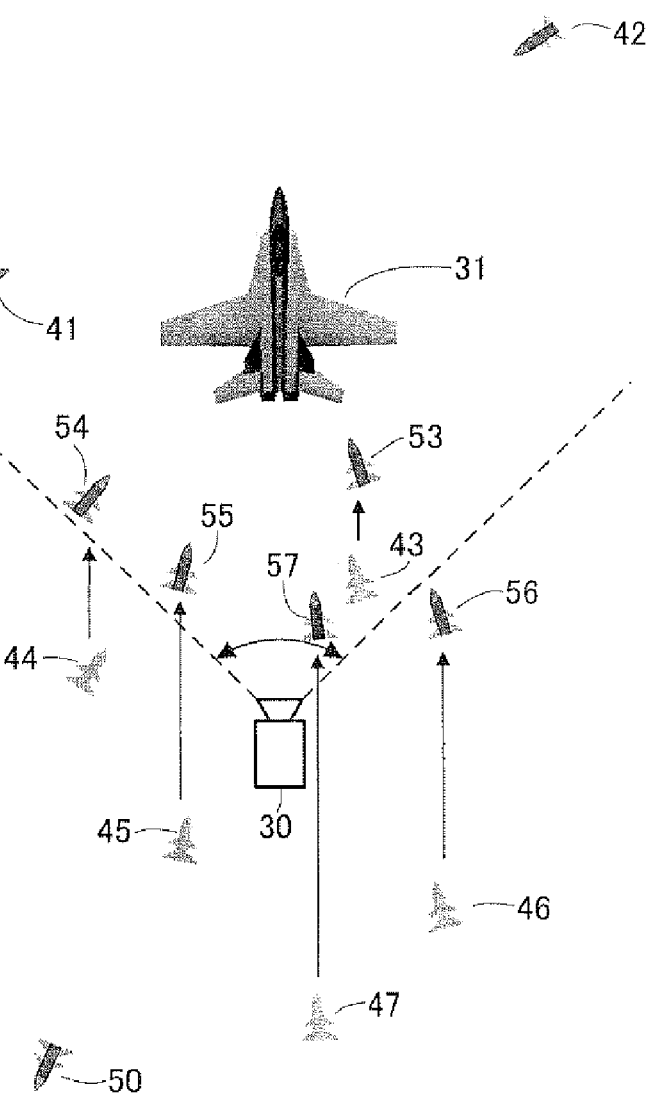
FIG. 17 is a diagram for explaining a modified example of a method for setting a correction flag 136.

FIG. 17 is a diagram for explaining a modified example of the method for setting the correction flag 136. In the above-described embodiment, the case where the correction flags 136 for all the non-player objects within the virtual game space are set to be "1", has been described. Here, for a missile 50 which continues moving away from the player object 31 and does not approach or attack the player object 31, the correction flag 136 may be set to be "0", and the coordinate determination section 103 may not perform the determined process. This is because the missile 50 is not an object that should be necessarily displayed on the screen.

In order to set the correction flag 136 differently depending on the non-player objects in this manner, the position coordinate data 134 of each non-player object may be used. Specifically, a determination process for determining whether or not the position coordinate of the non-player object continues moving away from the position coordinate of the player object 31 for a predetermined time period, is performed per frame. When the position coordinate of the non-player object continues moving away from the position coordinate of the player object 31 for a time period corresponding to "100" frames for example, the correction flag 136 is changed from "1" to "0". Thereby, only for a non-player object considered to be one that need be displayed on the liquid crystal television 2, whether or not the non-player object is located on the side of the virtual camera 30 relative to the position coordinate 80 of the player object 31 may be determined.

Note that a plurality of threshold values may be used for the determination process for determining whether or not a non-player object is located on the side of the virtual camera 30 relative to the position coordinate 80 of the player object 31 which serves as the predetermined point. For example, whether or not a non-player object (such as the missile 41, 44, or 45) located to the left of the player object 31 when seen from the virtual camera 30 is on the side of the virtual camera 30 relative to the position coordinate 80 of the player object 31, may be determined based on a threshold value A (for example, '0'), and whether or not a non-player object (such as the missile 42, 43, 46, or 47) located to the right of the player object 31 when seen from the virtual camera 30 is on the side of the virtual camera 30 relative to the position coordinate 80 of the player object 31, may be determined based on a threshold value B (for example, '−0.1').

Moreover, whether or not a non-player object is located on the side of the virtual camera 30 relative to the position coordinate 80 of the player object 31 which serves as the predetermined point, may be determined based on, instead of the magnitude relation between the inner product F and the threshold value, whether or not the inner product F is included in a predetermined value range. For example, under a condition that the inner product F is included in a range of not less than '−10' and less than '0', it may be determined that a non-player object is located on the side of the virtual camera 30 relative to the position coordinate 80. As a result, for a non-player object (for example, the missile 50) of which a camera orientation vector V2 and an object orientation vector V1 form an angle larger than 90 degrees (the inner product F is less than '0') and of which a distance from the player object 31 is relatively large, it can be determined that the non-player object is not located on the side of the virtual camera 30 relative to the position coordinate 80. Thus, a non-player object desired to be made closer to the player object 31 and displayed in this state can be easily selected without performing a process such as changing the correction flag 136 which has been described above based on FIG. 17.

In the above-described embodiment, the case where the position coordinate 80 of the player object 31 is set as the predetermined point, has been described. In the modification based on FIG. 16, the case where the observed point 77 is set as the predetermined point, has been described. However, the position of the predetermined point is not limited to the position coordinate 80 or the observed point 77. That is, the predetermined point may not be the position coordinate 80 or the observed point 77, as long as the predetermined point is set between the viewpoint the virtual camera 30 and the player object 31 with respect to the image capturing direction 81 of the virtual camera 30 or between the viewpoint of the virtual camera 30 and the observed point 77 with respect to the image capturing direction 81 of the virtual camera 30. This is because, when, for example, the predetermined point is set at a position ahead of the observed point 77 shown in FIG. 16 with respect to the image capturing direction 81 of the virtual camera 30, the process for calculating a correction coordinate is performed also for the missile 42. This causes an unnecessary and unnatural display in which the missile 42 is located farther from the player object 31.

In the above-described embodiment, the case where the camera orientation vector V2 and the object orientation vector V1 are used for determining whether or not the position coordinate of the non-player object is located on the side of the virtual camera 30 relative to the position coordinate 80, has been described. Here, a combination of the camera orientation vector and the object orientation vector is not limited to the above-described one. For example, the camera orientation vector V2, and an object orientation vector of which the initial point is a position coordinate of a non-player object and the end point is the position coordinate 80 of the player object 31, may be used. Alternatively, for example, a camera orientation vector of which the initial point is the position coordinate 80 of the player object 31 and the end point is the position coordinate of the virtual camera 30, and the object orientation vector V1, may be used. Alternatively, for example, a camera orientation vector of which the initial point is the position coordinate 80 of the player object 31 and the end point is the position coordinate of the virtual camera 30, and an object orientation vector of which the initial point is the position coordinate of the non-player object and the end point is the position coordinate of the player object 31, may be used.

In the above-described embodiment, a non-player object such as the missile 44 is, in a state of being located at a correction coordinate, displayed on the screen of the liquid crystal television 2. Therefore, a contact between objects may be determined based on, instead of the position coordinate 80 of the player object 31 and the position coordinate 34 of the missile 44, the position coordinate 80 of the player object 31 and the correction coordinate of the missile 44.

In the above-described embodiment, the case where the virtual camera 30 is controlled so as to observe the player object 31 from the rear thereof, has been described. Here, the virtual camera 30 may be controlled so as to observe the player object 31 from the front of the player object 31 for example. In this case, a non-player object, which exists in front of the player object 31 but is not displayed on the screen because the non-player object is not located within the field of view of the virtual camera 30, can be displayed on the screen.

In the above-described embodiment, the above-described game process is realized by one game apparatus 3. However, this is not essential. A plurality of information processing apparatuses may cooperate with each other to realize the above-described game process. That is, an apparatus other than the game apparatus 3, for example, a server apparatus on a network, may serve as at least one functional section among the input reception section 101, the position coordinate calculation section 102, the coordinate determination section 103, the correction coordinate calculation section 104, and the display section 105. In this case, a system including the game apparatus 3 and the server apparatus functions as the game system of the present invention.

The present invention is applicable to: a computer-readable storage medium having stored therein a game program to be executed by a computer of a game apparatus which displays on a display device an image showing an object within a virtual game space seen from a viewpoint of a virtual camera; a game system; and the like.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium having stored therein a game program to be executed by a computer of a game apparatus which displays, on a display device, an image, captured by a virtual camera, of an object included in a virtual game space, the game program causing the computer to function as:
   position coordinate calculator for calculating a position coordinate of a first object which is an object observed by the virtual camera and a position coordinate of a second object which is at least one object different from the first object;
   a coordinate determiner for determining, based on the position coordinate of the second object, whether or not the second object is located on a side of the virtual camera relative to a predetermined point located ahead of the virtual camera;
   a correction coordinate calculator for calculating, for the second object determined by the coordinate determiner to be located on the side of the virtual camera, a correction coordinate which is a coordinate obtained by shifting the position coordinate of the second object to a side of the predetermined point relative to the position coordinate of the second object; and
   a display generator for displaying, on the display device, an image of the virtual game space in which the first object is located at the position coordinate thereof, and the second object, which has been determined by the coordinate determiner to be located on the side of the virtual camera, is located at the correction coordinate thereof.

2. The non-transitory computer-readable storage medium according to claim 1, wherein the correction coordinate calculator calculates, as the correction coordinate of the second object which has been determined by the coordinate determiner to be located on the side of the virtual camera, a coordinate obtained by shifting the position coordinate of the second object in an image capturing direction of the virtual camera.

3. The non-transitory computer-readable storage medium according to claim 2, wherein the correction coordinate calculator calculates, as the correction coordinate of the second object which has been determined by the coordinate determiner to be located on the side of the virtual camera, a coordinate obtained by shifting the position coordinate of the second object to a position on the side of the virtual camera relative to the predetermined point.

4. The non-transitory computer-readable storage medium according to claim 3, wherein the correction coordinate calculator calculates the correction coordinate of the second object which has been determined by the coordinate determiner to be located on the side of the virtual camera, based on a first distance from the predetermined point to the position coordinate of the second object in the image capturing direction of the virtual camera.

5. The non-transitory computer-readable storage medium according to claim 4, wherein the correction coordinate calculator calculates the correction coordinate of the second object which has been determined by the coordinate determiner to be located on the side of the virtual camera, such that a distance from the predetermined point to the correction coordinate of the second object in the image capturing direction of the virtual camera is a predetermined ratio of the first distance.

6. The non-transitory computer-readable storage medium according to claim 1, wherein the correction coordinate calculator calculates, as the correction coordinate of the second object which has been determined by the coordinate determiner to be located on the side of the virtual camera, a coordinate obtained by shifting the position coordinate of the second object toward the predetermined point.

7. The non-transitory computer-readable storage medium according to claim 6, wherein the correction coordinate calculator calculates, as the correction coordinate of the second object which has been determined by the coordinate determiner to be located on the side of the virtual camera, a coordinate obtained by shifting the position coordinate of the second object to a position on the side of the virtual camera relative to the predetermined point.

8. The non-transitory computer-readable storage medium according to claim 7, wherein the correction coordinate calculator calculates the correction coordinate of the second object which has been determined by the coordinate determiner to be located on the side of the virtual camera, based on a first distance from the predetermined point to the position coordinate of the second object in the image capturing direction of the virtual camera.

9. The non-transitory computer-readable storage medium according to claim 8, wherein the correction coordinate calculator calculates the correction coordinate of the second object which has been determined by the coordinate determiner to be located on the side of the virtual camera, such that a distance from the predetermined point to the correction coordinate of the second object in the image capturing direction of the virtual camera is a predetermined ratio of the first distance.

10. The non-transitory computer-readable storage medium according to claim 1, wherein the coordinate determiner determines whether or not the second object is located on the side of the virtual camera relative to the predetermined point with respect to an image capturing direction of the virtual camera.

11. The non-transitory computer-readable storage medium according to claim 1, wherein the coordinate determiner determines whether or not the second object is located on the side of the virtual camera relative to the predetermined point, based on an orientation of a line segment of which edge points are the position coordinate of the virtual camera and the predetermined point, and an orientation of a line segment of which edge points are the predetermined point and the position coordinate of the second object.

12. The non-transitory computer-readable storage medium according to claim 11, wherein
the coordinate determiner includes:
a vector calculator for calculating a camera orientation vector of which an initial point is a position of the virtual camera and an end point is the predetermined point, and an object orientation vector of which an initial point is the predetermined point and an end point is the position coordinate of the second object; and
a vector determiner for determining whether or not the second object is located on the side of the virtual camera relative to the predetermined point, based on the camera orientation vector and the object orientation vector calculated by the vector calculator.

13. The non-transitory computer-readable storage medium according to claim 12, wherein
the coordinate determiner further includes an inner product calculator for calculating an inner product of the camera orientation vector and the object orientation vector, and
the vector determiner determines whether or not the second object is located on the side of the virtual camera relative to the predetermined point, based on the inner product calculated by the inner product calculator.

14. The non-transitory computer-readable storage medium according to claim 13, wherein the vector determiner determines whether or not the second object is located on the side of the virtual camera relative to the predetermined point, based on a magnitude relation between the inner product calculated by the inner product calculator and a predetermined threshold value.

15. The non-transitory computer-readable storage medium according to claim 1, wherein
the position coordinate calculator calculates position coordinates of the two or more second objects, and
the coordinate determiner determines whether or not each of the second objects, of which the position coordinates are calculated by the position coordinate calculator, is located on the side of the virtual camera relative to the predetermined point.

16. The non-transitory computer-readable storage medium according to claim 1, wherein the predetermined point is set between a position of the virtual camera and the first object with respect to the image capturing direction of the virtual camera or between the position of the virtual camera and an observed point observed by the virtual camera with respect to the image capturing direction of the virtual camera.

17. The non-transitory computer-readable storage medium according to claim 16, wherein the predetermined point is the position coordinate of the first object or the observed point.

18. The non-transitory computer-readable storage medium according to claim 1, wherein the display generator displays, on the display device as an image captured by the virtual camera, an image of a drawing space different from a space in which the first object and the second object are located at their respective position coordinates, on the display device.

19. The non-transitory computer-readable storage medium according to claim 1, wherein the display generator displays, on the display device, an image captured by the virtual camera, in which the position coordinate of the first object, the position coordinate of the second object which has been determined by the coordinate determiner to be not located on the side of the virtual camera, and the correction coordinate of the second object which has been determined by the coordinate determiner to be located on the side of the virtual camera, are center-of-gravity coordinates of the respective objects.

20. The non-transitory computer-readable storage medium according to claim 1, wherein
the program causes the computer to function further as an input receiver for receiving an input of operation information from an input device which is operated by a player, and
the position coordinate calculator calculates the position coordinate of the first object, based on the operation information received by the input receiver.

21. A game system which displays on a display device an image, captured by a virtual camera, of an object included in a virtual game space, the game system comprising:
a position coordinate calculator for calculating a position coordinate of a first object which is an object observed by the virtual camera and a position coordinate of a second object which is at least one object different from the first object;
coordinate determiner for determining, based on the position coordinate of the second object, whether or not the second object is located on a side of the virtual camera relative to a predetermined point which is located ahead of the virtual camera;
correction coordinate calculator for calculating, for the second object determined by the coordinate determiner to be located on the side of the virtual camera, a correction coordinate which is a coordinate obtained by shifting the position coordinate of the second object to a side of the predetermined point relative to the position coordinate of the second object; and
a display generator for displaying, on the display device, an image of the virtual game space in which the first object is located at the position coordinate thereof, and the second object, which has been determined by the coordinate determiner to be located on the side of the virtual camera, is located at the correction coordinate thereof.

22. A game display method for displaying on a display device an image, captured by a virtual camera, of an object included in a virtual game space, the game display method comprising the steps of:
calculating a position coordinate of a first object which is an object observed by the virtual camera and a position coordinate of a second object which is at least one object different from the first object;
determining, based on the position coordinate of the second object, whether or not the second object is located on a side of the virtual camera relative to a predetermined point which is located ahead of the virtual camera;
calculating, for the second object determined to be located on the side of the virtual camera, a correction coordinate which is a coordinate obtained by shifting the position coordinate of the second object to a side of the predetermined point relative to the position coordinate of the second object; and
displaying, on the display device, an image of the virtual game space in which the first object is located at the position coordinate thereof, and the second object, which has been determined to be located on the side of the virtual camera, is located at the correction coordinate thereof.

* * * * *